(12) United States Patent
Oishi

(10) Patent No.: US 7,034,496 B2
(45) Date of Patent: Apr. 25, 2006

(54) POINTING POSITION CORRECTING METHOD, POINTING POSITION CORRECTING APPARATUS, AND POINTING APPARATUS

(75) Inventor: Masaki Oishi, Shimada (JP)

(73) Assignee: Yazaki Corporation, Tokyo (JP)

( * ) Notice: Subject to any disclaimer, the term of this patent is extended or adjusted under 35 U.S.C. 154(b) by 9 days.

(21) Appl. No.: 10/958,345

(22) Filed: Oct. 6, 2004

(65) Prior Publication Data

US 2005/0083008 A1   Apr. 21, 2005

(30) Foreign Application Priority Data

Oct. 6, 2003   (JP) ............................ P2003-346760

(51) Int. Cl.
 *H02P 8/04*   (2006.01)
 *H02P 8/06*   (2006.01)
 *H02P 8/00*   (2006.01)

(52) U.S. Cl. ...................... 318/696; 318/500; 318/585; 318/685; 116/284; 116/289; 116/294; 73/1.37; 73/1.88

(58) Field of Classification Search ................ 318/685, 318/696, 585, 500; 116/284, 289
See application file for complete search history.

(56) References Cited

U.S. PATENT DOCUMENTS

| 5,847,475 A | * | 12/1998 | Rauch et al. ............. 310/49 R |
| 6,014,075 A | * | 1/2000 | Fujimori et al. ............. 340/461 |
| 6,731,092 B1 | * | 5/2004 | Shimazaki ................... 318/685 |
| 6,741,058 B1 | * | 5/2004 | Yamada et al. .............. 318/685 |
| 6,956,351 B1 | * | 10/2005 | Yamada ....................... 318/685 |
| 2004/0108829 A1 | * | 6/2004 | Betts et al. .................. 318/696 |

FOREIGN PATENT DOCUMENTS

| JP | 2002-5698 A | 1/2002 |
| JP | 2002-139354 A | 5/2002 |

* cited by examiner

Primary Examiner—David Martin
Assistant Examiner—Elias B. Hiruy
(74) Attorney, Agent, or Firm—Sughrue Mion, PLLC

(57) ABSTRACT

A method of correcting a pointing position of a pointer rotated by a stepper motor includes the steps of: performing a preset operation in which the pointer is rotated to a reset operation starting position that represents a pointing position of the pointer which is shifted by a predetermined amount in a plus direction of a scale from a reset position where a pin which is rotated in conjunction with a rotation of the pointer abuts against a fixed stopper; after the preset operation, performing a reset operation in which the pointer is rotated in a minus direction of the scale to the reset position; and after the reset operation, performing a correcting operation in which the pointer is rotated in the plus direction up to a reference pointing position which is indicated by previously stored reference pointing positional information.

5 Claims, 12 Drawing Sheets

AT TIME OF
ROTATING

AT TIME OF
STOPPING

AT TIME OF ROTATING

AT TIME OF STOPPING

POINTING POSITION CORRECTING METHOD, POINTING POSITION CORRECTING APPARATUS, AND POINTING APPARATUS

BACKGROUND OF THE INVENTION

The present invention is related to a pointing position correcting method, a pointing position correcting apparatus, and a pointing apparatus, which correct a shift between a pointing position when a rotation of a pointer is stopped by that a driven member rotated in conjunction with a rotation of this pointer abuts against a fixed stopper, and a reference pointing position for pointing a zero on a scale, while the pointer is rotated by a stepper motor in such a manner that this pointer points a place in response to a measurement amount on a scale.

Conventionally, as a pointing apparatus for pointing out a place of a scale responding to a measurement value on a dial by rotating a pointer by a stepper motor, for instance, such a pointing apparatus is known which contains pointers for pointing out a speed of a vehicle and an engine revolution number. As represented in FIG. 12, the above-described pointing apparatus is equipped with a stepper motor 19 having two energizing coils 19a and 19b and a magnet rotor 19c; a pointer 17; gear trains 21 and 23; and a driving control apparatus 41. In the magnet rotor 19c, N and S poles are alternately magnetized in a multiple polarity mode, and the magnet rotor 19c is rotated in response to changes in energizing conditions of the energizing coils 19a and 19b. The pointer 17 is rotated in conjunction with rotation drives of the magnet rotor 19c. The gear trains 21 and 23 transfer the rotation drive force of the magnet rotor 19c to a pointer 17. The driving control apparatus 41 controls the energizing conditions of the energizing coils 19a and 19b so as to rotate the magnet rotor 19c along a normal direction and a reverse direction.

In the case that the above-described pointing apparatus is employed as a vehicle speed indicator (vehicle speedmeter), angle data "D1" indicative of a rotation angle of the magnet rotor 19c is supplied to the driving control apparatus 41. This angle data D1 corresponds to a move amount "?=?" which is equal to a difference between a target position "?" and a present position "?'." The target position "?" is equal to such a position on a scale, which should be pointed out by the pointer 17 and has been calculated based upon vehicle speed information measured by a vehicle speed sensor. The present position "?'" is equal to such a position on the scale, which is presently pointed out by the pointer 17. Then, the driving control apparatus 41 controls the energizing conditions of the energizing coils 19a and 19b in response to this angle data D1, so that the pointer 17 is moved by the difference "?–?'" so as to point out the target position.

On the other hand, since the angle data D1 is inputted to which either vibrations of the vehicle or noise has been superimposed, a loss of synchronism may occur in which the move amount (=difference "?–?'") over which the pointer 17 must be originally moved is different from the actual move amount. Then, if this loss of synchronism repeatedly occurs, then there is a difference between the speed (namely, position on scale) which is actually pointed by the pointer 17 and the speed (namely, position on scale) which should be originally pointed by the pointer 17 and corresponds to the speed information measured by the speed sensor. As a result, the pointing apparatus cannot point out the correct speed.

To solve such a problem, as indicated in FIG. 13, a stopper 31 is provided on a dial 43 in such a manner that when the pointer 17 points out 0 Km/h on the scale of the dial 43, the pointer 17 abuts against this stopper 31. Every time an ignition switch is turned ON/OFF, or a battery is connected, such a reset operation has been carried out (for example, patent publication 1). That is, in this reset operation, since the pointer 17 is moved to the side of the stopper 31 and also is forcibly stopped at the zero position where the pointer 17 points out 0 Km/h on the scale, a difference between a speed pointed by the pointer 17 and speed information measured by the speed sensor is reset.

However, as explained above, when the stopper 31 is provided on the dial 43 of the pointing device, the appearance of the pointing apparatus may be damaged. As a consequence, as represented in FIG. 12, a pin 23a is provided with a gear 23 within the gear trains 21 and 23 located at a rear side of the dial (not shown), while the pin 23a is rotated in conjunction with the gear 23. The stopper 31 which mechanically stops the pin 23a is provided within a housing of a meter in order that the pointer 17 points out 0 Km/h on the dial at such a position that the pin 23a abuts against the stopper 31. If such a construction is employed, then the stopper 31 does not appear on the front surface thereof, but also the appearance of the pointing apparatus is not damaged (for example, patent publication 2).

On the other hand, generally speaking, in a meter using this sort of pointer 17, such a work for driving the pointer 17 in a pointer shaft (not shown) is required, while this pointer shaft penetrates a center of a magnet rotor 19c of a stepper motor 19. In this driving work, the position where the pointer 17 is driven with respect to the pointer shaft is positionally shifted from the original point along the rotation direction of the pointer shaft.

Then, in the case that the pointer 17 is driven in the pointer shaft while this pointer 17 is actually shifted along the rotation direction of the pointer shaft, as to the pointing apparatus in which the stopper 31 is provided on the dial 7 as previously explained with reference to FIG. 13, when the pointer 17 abuts against the stopper 31, the pointing position of the pointer 17 with respect to the scale on the dial 7 is reformed to the zero position where the pointer 17 points out 0 Km/h on the scale irrespective of such a condition as to whether or not there is a shift in the position where the pointer 17 is driven with respect to the pointer shaft. In this case, if the reset operation is carried out, then the difference between the speed pointed out by the pointer 17 and the speed information measured by the speed sensor is reset without trouble.

However, as shown in FIG. 12, in the pointing apparatus for providing the pin 23a on the gear 23 provided on the rear side of the dial, if the driving position of the pointer 17 is shifted along the rotation direction of the pointer shaft, then the position of the pointer 17 with respect to the pin 23a provided on the gear 23 is shifted along the rotation direction of the pointer shaft. As a result, even when the pin 23a abuts against the stopper 31, the pointer 17 does not point out 0 Km/h on the dial, but may point out such a position which is shifted by a driving shift of the pointer 17. As a consequence, there is a deviation between a speed pointed by the pointer 17 and speed information measured by the speed sensor, so that the pointer 17 cannot point out the correct speed.

Therefore, the Applicant has proposed the pointing apparatus in the past. That is, in such a pointing apparatus in which the pin 23a is provided on the gear 23 located on the rear side of the dial as shown in FIG. 12, even when the pointer 17 is mounted on the pointer shaft with a shift while maintaining such a positional relationship that when the pin 23a abuts against the stopper 31, the pointer 17 points out a place other than 0 Km/h on the dial, such a reset operation is carried out in order that the pin 23a abuts against the stopper 31. Thereafter, the shift of the mounting position of the pointer 17 with respect to the pointing shaft thereof can be reformed, and thus, the pointing position of the pointer 17 can be corrected to such a position that the pointer 17 points out 0 Km/h on the scale.

However, if the pointer 17 is driven with a shift with respect to the pointer shaft in such a manner that when the pin 23a abuts against the stopper 31, the pointer 17 points out such a place which is shifted to a plus direction (direction along which pointed value on scale is increased: right turning direction in FIG. 12) from 0 Km/h, then it is physically impossible to rotate the pointer 17 along a minus direction (direction along which pointed value on scale is decreased: left turning direction) and to reform the shift as long as the pin 23a abuts against the stopper 31.

Thus, in the pointing position correcting apparatus which has been proposed in the past by the Applicant and a pointing apparatus containing this pointing position correcting apparatus, while the maximum shift amount of the pointer 17 with respect to the pointer shaft is previously predicted, even when the pointer 17 is driven with respect to the pointer shaft with being shifted by this maximum shift amount, the relative position between the stopper 31 and the pin 23a is set in such a manner that when the pin 23a abuts against the stopper 31 by way of the reset operation, the pointer 17 points out such a place which is slightly shifted from 0 Km/h on the dial along the minus direction.

Then, after the reset operation has been carried out, the correcting operation is performed (patent publication 2). In this reset operation, while the rotation amount of the magnet rotor 19c has been written in the memory and this rotation amount is required so as to return the zero scale on the dial to the position pointed by the pointer 17, the pointer 17 is rotated along the minus direction until the pin 23a abuts against the stopper 31 under control of the driving control apparatus 45. In the correcting operation, the magnet rotor 19c is rotated by the rotation amount written in the memory so as to rotate the pointer 17 along the plus direct, so that the pointer 17 is returned to such a position for pointing out the zero scale on the dial.

Patent publication 1:
   Japanese Laid-open Patent Application No. 2002-5698

Patent publication 2:
   Japanese Laid-open Patent Application No. 2002-139354

On the other hand, in a general-purpose combination meter having plural sets of the pointers 17 (for example, speed meter, tachometer, fuel meter, water temperature meter etc.) which are rotated by the stepper motor 19, there are some possibilities that the above-described problem may occur as to each of these plural meters. That is, the driving position of the pointer 17 with respect to the pointer shaft after the gear 23 has been mounted is shifted along the rotation direction of the pointer shaft with respect to the position of the pin 23a provided on the gear 23. Moreover, there are great possibilities that shift amounts produced in the respective meters are fluctuated.

As a result, in the pointing apparatus with employment of the rotation amount of the pointer 17 along the minus direction during the reset operations, which has been uniformly set, the rotation amounts (time durations) required until the pins 23a abut against the stoppers 31 are fluctuated between a meter having a large shift amount as to a driving position of the pointer 17 with respect to the pointer shaft, and another meter having a small shift amount as to a driving position of the pointer 17 with respect to the pointer shaft. Thus, even after the pin 23a has already abutted against the stopper 31 in the meter having the small shift amount of the driving position of the pointer 17, the control operation cannot be advanced to the next correcting operation and therefore is under waiting condition until the pin 23a abuts against the stopper 31 in the meter having the large shift amount of the driving position of the pointer 17.

As previously explained, in the combination meter having a plurality of such pointers 17 rotated by the stepper motors 19, as the stopper construction of each of these meters, when such a construction shown in FIG. 12 is employed, in the case that both the reset operations and the correcting operations are necessarily carried out, anew technical idea is necessarily required in order that the pointers 17 of the respective meters are more quickly advanced to the normal operations as to a different point from such a case that both a reset operation and a correcting operation are carried out with respect to a single pointer 17. In the above-explained stopper construction, the pin 23a is provided with the gear 23 located on the rear side of the dial, and this pin 23a abuts against the stopper 31 provided in the housing.

SUMMARY OF THE INVENTION

The present invention has been made to solve the above-explained problems, and therefore, has an object to provide a pointing position correcting apparatus and a pointing apparatus containing this pointing position correcting apparatus, capable of more quickly performing both a reset operation and a correcting operation which are necessarily carried out so as to correctly maintain pointing precision as to pointers of respective meters in a combination meter, and also capable of more quickly advancing a pointer of each meter, eventually, the pointers of all of the meters to the normal operation, even if such a stopper construction is employed. That is, in the combination meter having the plural sets of these pointers rotated by stepper motors, a member to be driven is provided with a gear located on a rear side of a dial and this member to be driven abuts against a stopper within a housing as a stopper construction of each of these meters.

In order to solve the aforesaid object, the invention is characterized by having the following arrangement.

(1) A method of correcting a pointing position of a pointer rotated by a stepper motor, the method comprising the steps of:

performing a prereset operation in which the pointer is rotated to a reset operation starting position which is indicated by a previously stored reset operation starting positional information, wherein the reset operation starting position represents a pointing position of the pointer which is shifted by a predetermined amount in a plus direction of a scale from a reset position where a pin which is rotated in conjunction with a rotation of the pointer abuts against a fixed stopper;

after the prereset operation, performing a reset operation in which the pointer is rotated in a minus direction of the scale to the reset position; and after the reset operation, performing a correcting operation in which the pointer is rotated in the plus direction up to a reference pointing position which is indicated by previously stored reference pointing positional information.

(2) A pointing position correcting apparatus for correcting a pointing position of a pointer rotated by a stepper motor, the pointing position correcting apparatus being adapted to perform:

a prereset operation in which the pointer is rotated to a reset operation starting position which is indicated by a previously stored reset operation starting positional information, wherein the reset operation starting position represents a pointing position of the pointer which is shifted by a predetermined amount in a plus direction of a scale from a reset position where a pin which is rotated in conjunction with a rotation of the pointer abuts against a fixed stopper;

a reset operation in which the pointer is rotated in a minus direction of the scale to the reset position; and a correcting operation in which the pointer is rotated in the plus direction up to a reference pointing position which is indicated by previously stored reference pointing positional information, wherein the reset operation is performed after the prereset operation, and the correcting operation is performed after the reset operation.

(3) A pointing apparatus comprising:

a pointer that is rotated by a stepper motor in such a manner that said pointer points out a place corresponding to a measurement amount on a scale;

the stepper motor;

a pin which that is rotated in conjunction with a rotation of the pointer;

a fixed stopper that is adapted to be abutted against the pin; and a pointing position correcting apparatus for correcting a pointing position of the pointer, the pointing position correcting apparatus being adapted to perform:

a prereset operation in which the pointer is rotated to a reset operation starting position which is indicated by a previously stored reset operation starting positional information, wherein the reset operation starting position represents a pointing position of the pointer which is shifted by a predetermined amount in a plus direction of the scale from a reset position where the pin which is rotated in conjunction with a rotation of the pointer abuts against the fixed stopper;

a reset operation in which the pointer is rotated in a minus direction of the scale to the reset position; and a correcting operation in which the pointer is rotated in the plus direction up to a reference pointing position which is indicated by previously stored reference pointing positional information, wherein the reset operation is performed after the prereset operation, and the correcting operation is performed after the reset operation.

(4) The pointing apparatus according to (3), wherein the stepper motor includes first and second coils that are energized by patterns whose phases are shifted from each other and a magnet rotor that is located opposite to the first and second coils and is connected directly or indirectly to the pointer, the pointer is rotated by controlling the energization of the first and second coils, stopping of the rotation of the pointer in the reset operation is detected by detecting a transition from a condition in which an induction voltage generated by at least one of the first and second coils under non-energizing condition exceeds a predetermined level to another condition in which the induction voltage becomes lower than or equal to the predetermined level in connection with the rotation of the magnet rotor, and the reset operation starting position is set so that a rotating amount of the pointer from the reset operation starting position to the reset position is sufficient for generating the induction voltage exceeding the predetermined level.

(5) The pointing apparatus according to (3), wherein a plurality of the pointers are provided which are rotated by the respective stepping motors, the reference pointing positional information for each pointer are separately stored in a storage of the pointing position correcting apparatus, the reset operation starting positional information for each pointer are separately stored in a storage of the pointing position correcting apparatus, the prereset operation is carried out in such a manner that when a command signal is inputted, each of the pointers is rotated to the reset operation starting position which is indicated by the reset operation starting positional information for the respective pointers in a separate manner every the pointer, and the reset operation and the correcting operation are independently carried out in a separate manner with respect to each of the pointers.

In accordance with the pointing position correcting method of the present invention, when the command signal is entered, the prereset operation is firstly carried out. Even when the pointer points out any one of the pointing positions at the time when the command signal is inputted, this pointer is rotated without any restriction to the reset operation starting position which is shifted by a predetermined amount along the plus direction of the scale from the reset position where the pin abuts against the stopper to stop the rotation of the pointer. Then, both the reset operation and the correcting operation are carried out from this pointing position.

As a result, such an operation can be firmly avoided irrespective of the actual pointing position of the pointer when the command signal is inputted. That is, in this operation, with respect to the rotation amount of the pointer along the minus direction which is required so as to move the pointer from the actual pointing position of the pointer when the command signal is inputted up to the pointing position where the pin abuts against the stopper to stop the rotation of the pointer, the maximum rotation amount of the pointer along the minus direction becomes short which is predicted in the reset operation, so that the pointer cannot be moved up to the pointing position where the rotation of the pointer is stopped by the reset operation. After the pointer is firmly moved to the pointing position where the rotation of the pointer is stopped, the reset operation and the correcting operation subsequent to this reset operation are quickly carried out, and thus, the pointer can be more quickly advanced to the normal operation.

In accordance with the pointing position correcting method of the present invention, in the case that a detection is made of such a fact that the pin rotated in connection with the rotation of the pointer abuts against the fixed stopper to stop the rotation of the pointer in the reset operation by detecting the transition from such a condition that the induction voltage generated from such a coil under non-energizing condition exceeds the constant level to another condition that the induction voltage becomes lower than, or equal to the constant level within the first coil and the second coil in connection with the rotation of the magnet rotor in conjunction with the rotation of the magnet rotor positioned opposite to both the first and second coils of the stepper motor which are energized by the energizing patterns whose phases are mutually shifted, since the pointer is positioned to the reset operation starting position by the prereset operation, the pointer is rotated in the subsequent reset operation only by at least such a rotation amount capable of sufficiently generating the induction voltage in the coil under non-energizing condition. This induction voltage exceeds a constant level in conjunction with the rotation of the magnet rotor.

As a result, such an induction voltage having a higher level than a constant level by which can detect that the pointer through the magnet rotor are under rotation is surely generated in the beginning stage of the reset operation between the coil under non-energizing condition within the first and second coils which are energized so as to rotate the magnet rotor. Then, stopping of the rotation of the pointer in the reset operation can be correctly detected by detecting the transition from the condition that the induction voltage exceeds the constant level to the condition that the induction voltage becomes lower than, or equal to the constant level. It is possible to avoid such an operation that since the induction voltage does not exceed the constant level from the beginning stage but also stopping of the rotation of the pointer cannot be detected, the reset operation is completed and the pointer cannot be advanced to the correcting operation.

Further, in accordance with the pointing position correcting method of the present invention, in such a case that a plurality of pointers are presented, when a preset operation of the own pointer is accomplished, even if all of preset operations of other pointers are not yet accomplished, the next reset operation as to the own pointer may be commenced without waiting for the completions of these remaining preset operations. Similarly, when the reset operation of the own pointer is accomplished, even if all of reset operations of other pointers are not yet accomplished, the next correcting operation of the own pointer may be commenced without waiting for the completions of these reset operations.

As a consequence, in the case that the plural pointers are present, such a pointer which has been first of all reached to the pointing position where the rotation of the pointer is stopped, or to the reference pointing position may be advanced to the next operation without waiting for such a condition that other pointers are reached to these pointing positions. Finally, such a pointer which has been firstly reached to the reference pointing position can be quickly advanced to the normal operation without waiting for such a condition that other pointers are reached to the reference pointing positions.

In accordance with the pointing position correcting apparatus of the present invention, when the command signal is entered, the pointer is rotated without any restriction by the preset means to the reset operation starting position which is shifted by a predetermined amount from the reset position along the plus direction of the scale. This reset position is indicated by the reset operation starting positional information which has been previously stored in the reset starting position storage means. In this reset position, the pin abuts against the stopper so as to stop the rotation of the pointer. As a consequence, even if the pointer points out any one of the pointing positions when the command signal is inputted, after the pointer has been once rotated to the reset operation starting position without any restriction, both the reset operation and the correcting operation are carried out.

As a result, such an operation can be firmly avoided irrespective of the actual pointing position of the pointer when the command signal is inputted. That is, in this operation, with respect to the rotation amount of the pointer along the minus direction which is required so as to move the pointer from the actual pointing position of the pointer when the command signal is inputted up to the pointing position where the pin abuts against the stopper so as to stop the rotation of the pointer, the maximum rotation amount of the pointer along the minus direction $Y1$ becomes short which is predicted in the reset operation, so that the pointer cannot be moved up to the pointing position where the rotation of the pointer is stopped by the reset operation. After the pointer is firmly moved to the pointing position where the rotation of the pointer is stopped, the reset operation and the correcting operation subsequent to this reset operation are quickly carried out, and thus, the pointer can be more quickly advanced to the normal operation.

In accordance with the pointing position correcting apparatus of the present invention, in the case that a detection is made of such a fact that the pin rotated in connection with the rotation of the pointer abuts against the fixed stopper to stop the rotation of the pointer in the reset operation by detecting the transition from such a condition that the induction voltage generated from such a coil under non-energizing condition exceeds the constant level to another condition that the induction voltage becomes lower than, or equal to the constant level within the first coil and the second coil in connection with the rotation of the magnet rotor in conjunction with the rotation of the magnet rotor positioned opposite to both the first and second coils of the stepper motor which are energized by the energizing patterns whose phases are mutually shifted, since the pointer is positioned to the reset operation starting position by the preset means, the pointer is rotated in the subsequent reset operation only by at least such a rotation amount capable of sufficiently generating the induction voltage in the coil under non-energizing condition. This induction voltage exceeds a constant level in conjunction with the rotation of the magnet rotor.

As a result, such an induction voltage having a higher level than a constant level by which can detect that the pointer through the magnet rotor are under rotation is surely generated in the beginning stage of the reset operation between the coil under non-energizing condition within the first and second coils and which are energized so as to rotate the magnet rotor. Then, stopping of the rotation of the pointer in the reset operation can be correctly detected by detecting the transition from the condition that the induction voltage exceeds the constant level to the condition that the induction voltage becomes lower than, or equal to the constant level. It is possible to avoid such an operation that since the induction voltage does not exceed the constant level from the beginning stage but also stopping of the rotation of the pointer cannot be detected, the reset operation is completed and the pointer cannot be advanced to the correcting operation.

Further, in accordance with the pointing position correcting apparatus of the present invention, in such a case that a plurality of pointers are present, if the own pointer is located to the reset operation starting position by the preset unit, even when all of other pointers are not located to the reset operation starting positions by the preset unit, then the reset operation of the own pointer is commenced without waiting for a completion of positioning of all other pointers to the reset operation starting positions. Similarly, when the reset operation of the own pointer is accomplished, even if all of reset operations of other pointers are not yet accomplished, the next correcting operation of the own pointer maybe commenced without waiting for the completions of these reset operations.

As a consequence, in the case that the plural pointers are present, such a pointer which has been first of all reached to the pointing position where the rotation of the pointer is stopped, or to the reference pointing position may be advanced to the next operation without waiting for such a condition that other pointers are reached to these pointing positions. Finally, such a pointer which has been firstly reached to the reference pointing position can be quickly advanced to the normal operation without waiting for such a condition that other pointers are reached to the reference pointing positions.

BRIEF DESCRIPTION OF THE DRAWING

FIG. 6A is a timing chart of voltages generated when the magnet rotor is rotated; and FIG. 6B is a timing chart of voltages generated when the magnet rotor is stopped.

FIG. 7A is a timing chart of voltages generated when the magnet rotor is rotated; and FIG. 7B is a timing chart of voltages generated when the magnet rotor is stopped.

DETAILED DESCRIPTION OF PREFERRED EMBODIMENTS

Referring now to drawings, a description is made of an embodiment mode as to a pointing position correcting method and a pointing apparatus to which the above-described correcting method has been applied, according to the present invention.

Figure 1:
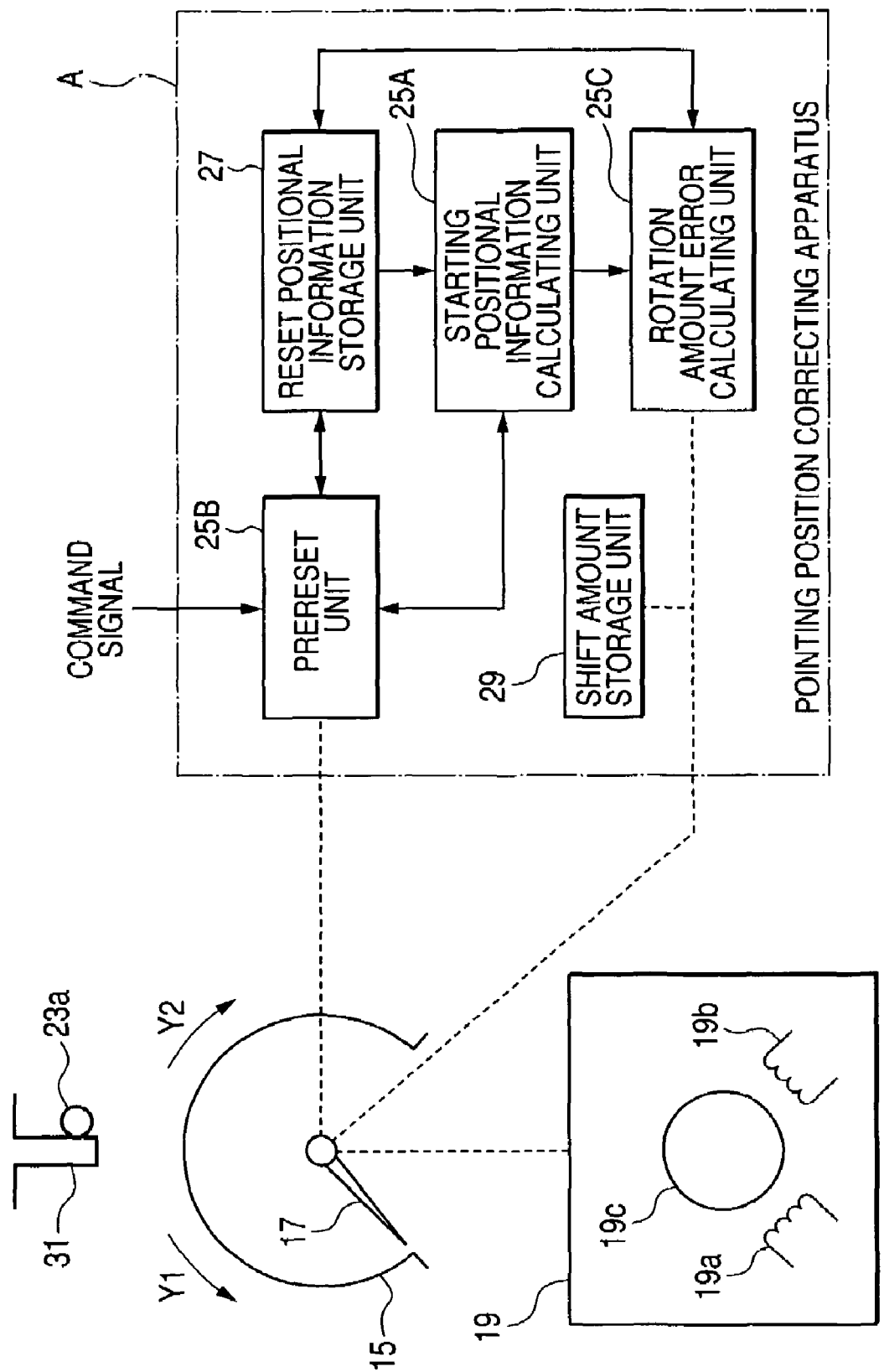
FIG. 1 is a basic structural diagram of both a pointing position correcting apparatus and a pointing apparatus, according to the present invention.
Figure 2:
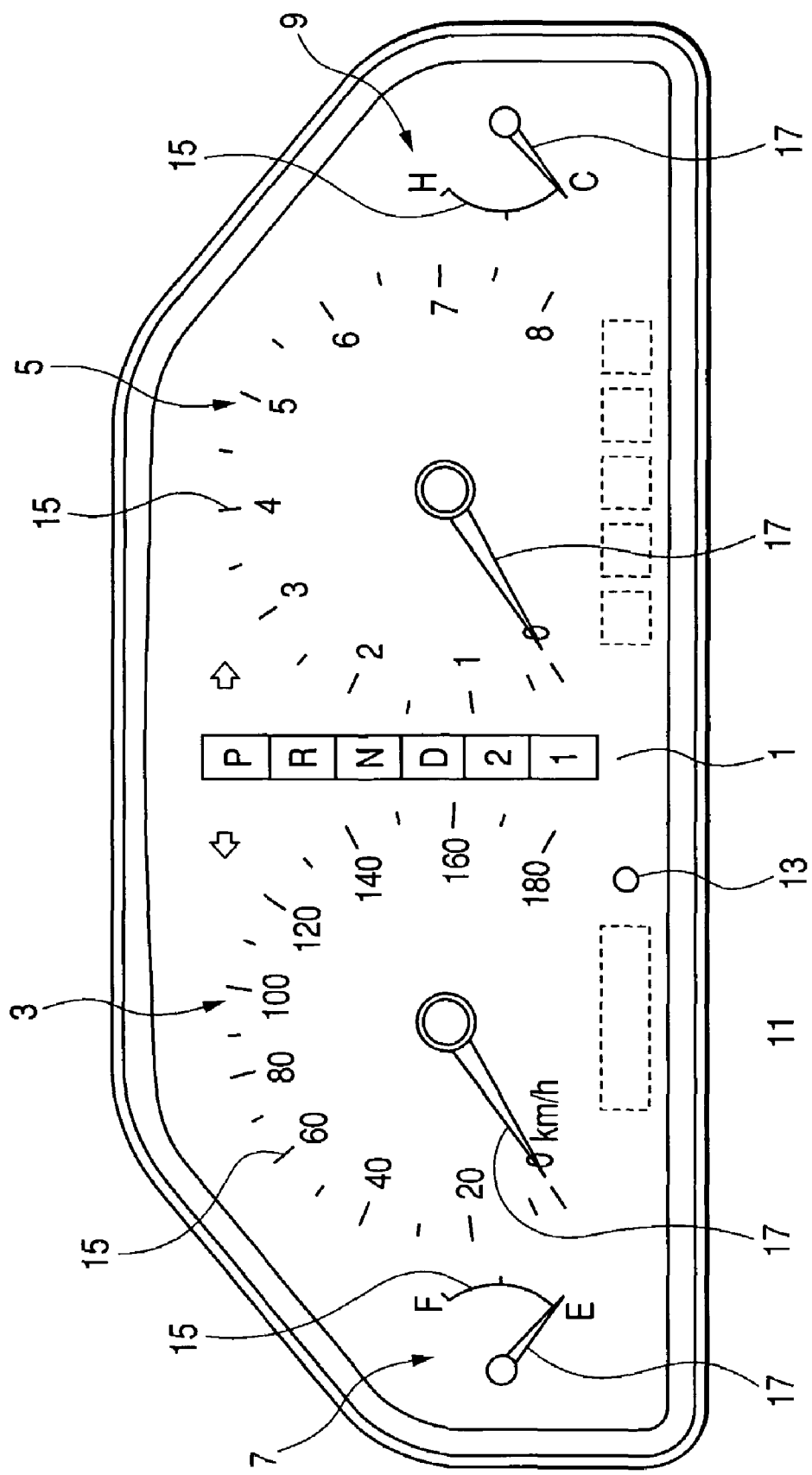
FIG. 2 is a front view of a vehicle-purpose display apparatus into which the pointing apparatus according to an embodiment mode of the present invention has been assembled.

FIG. 2 is a front view for showing a vehicle-purpose display apparatus into which a pointing apparatus according to an embodiment mode of the present invention has been assembled. The vehicle-purpose display apparatus of this embodiment mode contains a speed indicator 3, an engine tachometer 5, a fuel meter 7, a radiator water temperature meter 9, an odotrip switching type liquid crystal display device 11, and a push button type odotrip switching type switch (will be referred to as "O/T switch" hereinafter) 13, and the like on a character plate indicated by reference numeral 1 shown in FIG. 2.

Figure 3:
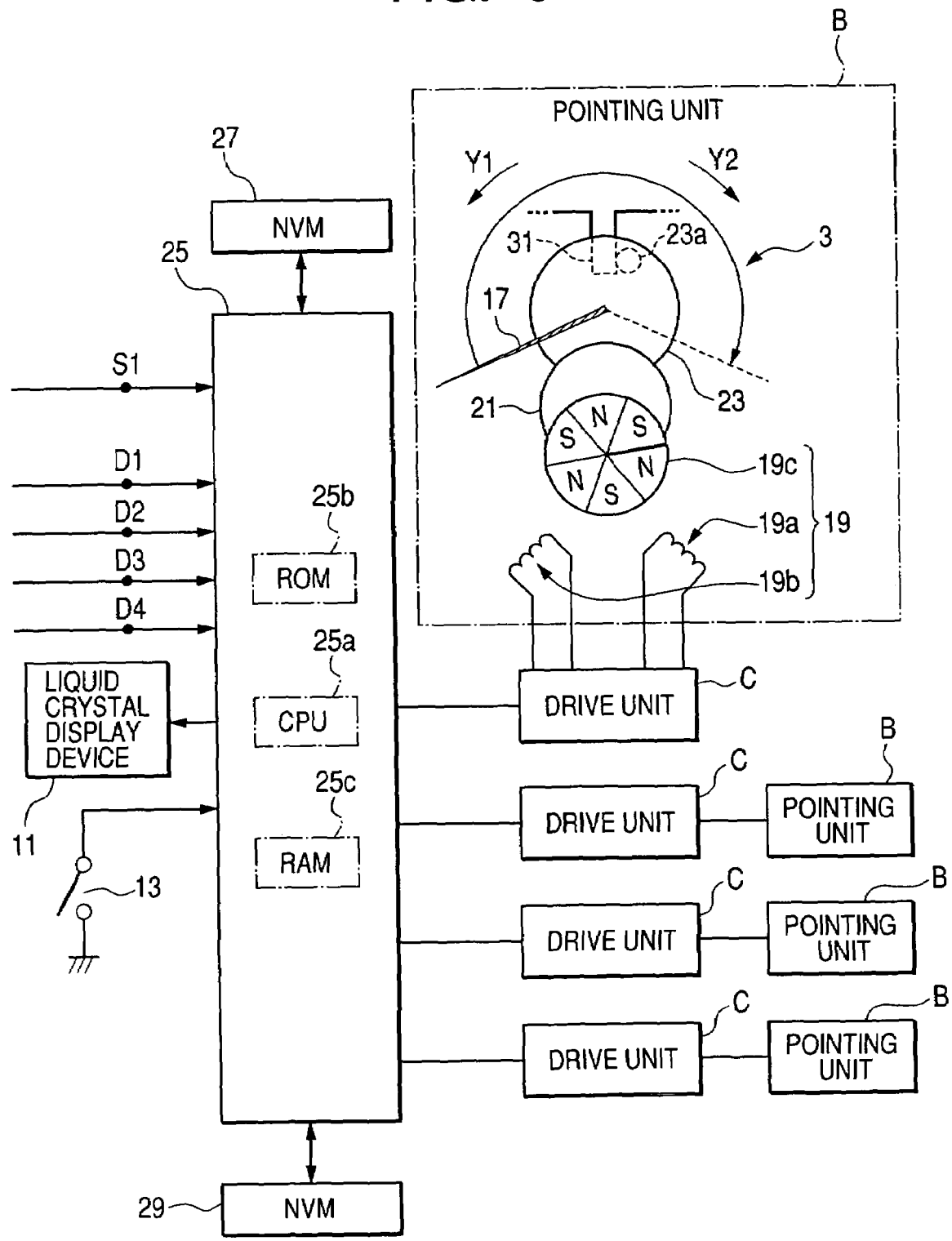
FIG. 3 is an explanatory diagram for partially indicating a schematic arrangement of the pointing apparatus according to one embodiment mode of the present invention by using a block.

Then, the pointing apparatus according to one embodiment mode of the present invention, the schematic structure of which is partially indicated by a block in an explanatory diagram of FIG. 3, is employed so as to drive pointers 17. The pointers 17 point out corresponding scale places on scales 15 of the speed indicator 3, the engine tachometer 5, the fuel motor 7, and the radiator water temperature meter 9 in response to measurement values of a speed sensor, an engine tachometer sensor, a remaining fuel sensor, and a temperature sensor (any of them are not shown).

Then, the pointing apparatus of this embodiment mode, shown in FIG. 3, contains instruction units "B" and drive units "C", which are separately provided with respect to the speed indicator 3, the engine tachometer 5, the fuel meter 7, and the radiator water temperature meter 9; and further contains a microcomputer (will be referred to as "μCOM" hereinafter) 25, and non-volatile memories (NVM) 27 and 28, which are commonly used with respect to all of the speed indicator 3, the engine tachometer 5, the fuel meter 7, and the radiator water temperature meter 9.

The above-described indicator units B are arranged by the above-described pointers 17, stepper motors 19 which rotatably drive the pointers 17, and gear trains 21 and 23 which decelerate power of the stepper motors 19 so as to transfer the decelerated power to the pointers 17. The above-described drive units C are arranged by drive circuits of the stepper motors 19, rotation condition detecting circuits thereof, and the like.

Since the μCOM 25 is to control driving operations of the stepper motors 19 via the drive unit C, both information and data have been stored in the NVM 27 and 29 in rewritable forms. The information is required for drive control operations of the stepper motors 19 by the μCOM 25. The drive control operations of the stepper motors 19 by the μCOM 25 are separately carried out with respect to each of the speed indicator 3, the engine tachometer, the fuel meter 7, and the radiator water temperature meter 9.

Each of the stepper motors 19 provided with respect to the speed indicator 3, the engine tachometer 5, the fuel meter 7, and the radiator water temperature meter 9 contains two energizing coils 19$a$ and 19$b$ (correspond to first and second coils); and also, a magnet rotor 19$c$ which is positioned opposite to these energizing coils 19$a$ and 19$b$. In this embodiment mode, the magnet rotor 19$c$ is constituted by multiple poles of magnetization in such a manner that "N" poles and "S" poles are alternately arranged every three poles.

A pin 23$a$ is projectedly provided at a place which is deviated from a rotation center of a rear surface of the gear train 23 within the gear trains 21 and 23. The pin 23$a$ is arranged in such a manner that this pin 23 can be engaged with a fixed stopper 31 which is projectedly provided on the housing side of the vehicle-purpose display apparatus. It should be noted that the stoppers 31 are separately projectedly provided with respect to the speed indicator 3, the engine tachometer 5, the fuel meter 7, and the radiator water temperature meter 9.

It should be noted in the below-mentioned description that a rotation of one pointer 17 along such a direction that a pointing value on one scale 15 is decreased (namely, left turning direction shown in FIG. 2) is referred to as a rotation of a minus direction "Y1", whereas a rotation of the pointer 17 along such a direction that a pointing value on the scale 15 is increased (namely, right turning direction shown in FIG. 2) is referred to as a rotation of a plus direction "Y2".

It should also be noted that since the magnet rotor 19c is rotated along the same direction as that of the pointer 17, the above-explained minus direction "Y1" and plus direction "Y2" maybe used as the expressions indicative of rotation directions of the magnet rotor 19c in the below-mentioned explanations.

On the other hand, the pointers 17 have been originally mounted (namely, are driven in pointer shafts which are not shown) in such a manner that when the pins 23a abut against the stoppers 31, the pointers 17 point zeroes (namely, 0 Km/h of speed indicator 3; 0 rpm of engine tachometer 5; and E; empty of fuel meter 7; and C: cool of radiator water temperature meter 9). However, in an actual case, certain errors may occur.

As a consequence, in this embodiment mode, in order to solve the mounting positional errors of the pointers 17 by executing a control operation, the pointers 17 are mounted under such a condition that the pointers 17 are intentionally shifted from the original positions of these pointers 17 to the side of the minus direction "Y1", assuming that targets of positions instructed by the pointers 17 when the pins 23a abut against the stoppers 31 are defined as places which are shifted from zero along the minus directions Y1 by such rotation amounts (for example, 1 to 2 degrees in unit of rotation angle of pointer 17) which are slightly larger than predictable maximum error amounts of the mounting positions.

As previously explained, even if the pointers 17 are intentionally shifted to the side of the minus direction so as to be mounted, the above-explained mounting positional errors may apparently occur. However, since the shift amounts of the mounting target positions with respect to zeroes on the scales 15 are larger than the maximum mounting positional errors, even if the mounting positional errors are added, then the positions pointed by the pointers 17 when the pins 23a abut against the stoppers 31 never become at least zero, and also never become such positions which are shifted from zero along the plus direction Y2.

Since the energizing conditions of the energizing coils 19a and 19b of the stepper motor 19 are changed based upon a predetermined pattern, the pointer 17 which has been assembled in the above-described manner is rotated along the plus direction Y2 and the minus direction Y1. In this connection, a relationship between the energizing conditions of the energizing coils 19a and 19b, and a rotation of the magnet rotor 19c will now be explained with reference to an explanatory diagram of FIG. 4.

Figure 4:
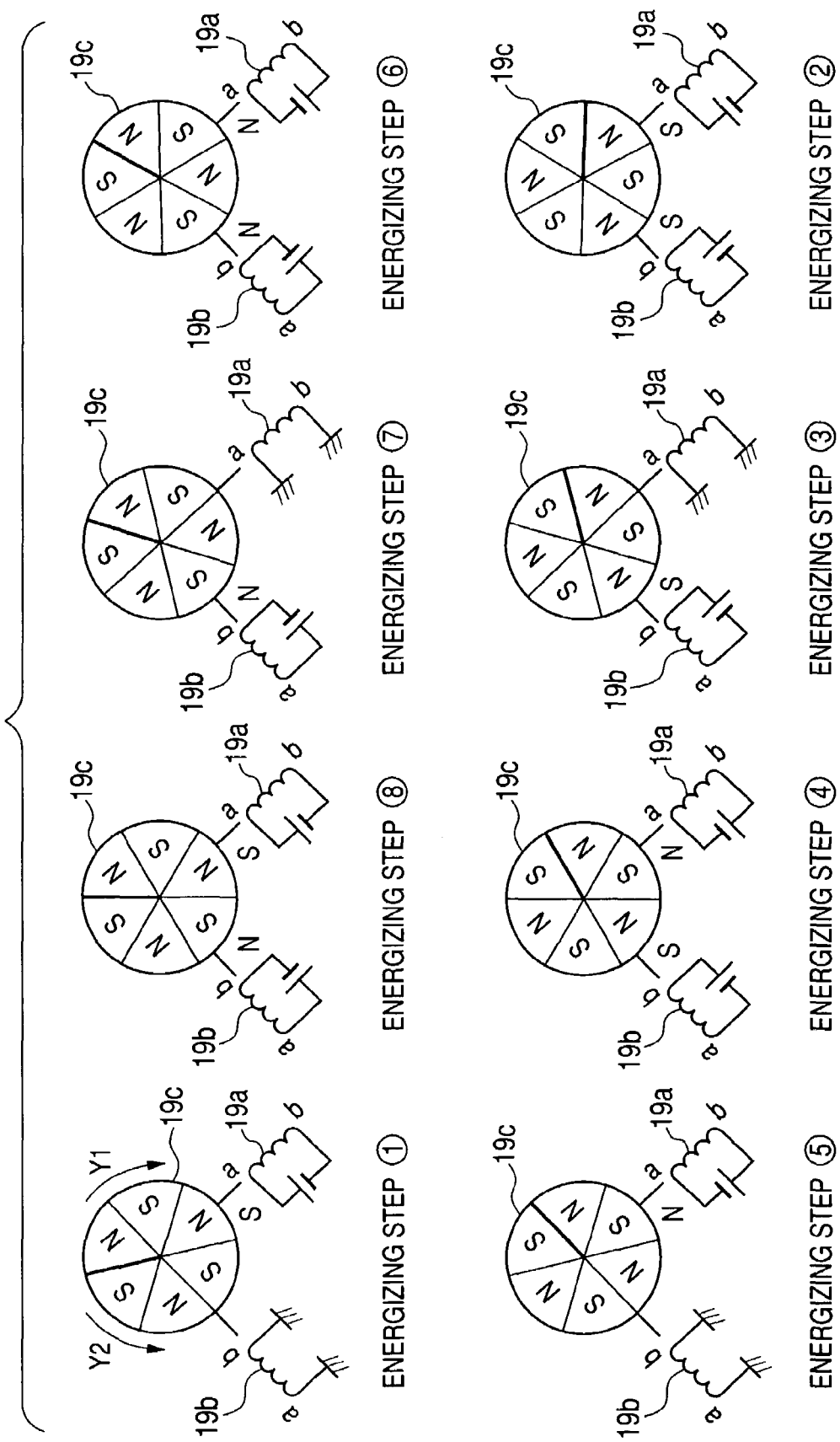
FIG. 4 is an explanatory diagram for indicating a relationship between energizing conditions of two energizing coils and rotations of a magnet rotor shown in FIG. 3.

It should be noted that in the explanations made with reference to FIG. 4, numerals "1" to "8" subsequent to indications "energizing step" are expressed by circling all of these numerals in FIG. 4.

First, when energizing conditions as to the energizing coils 19a and 19b are controlled under energizing conditions determined in an energizing step 1, namely, the a-side of the energizing coil 19a is set to an S pole and the energizing coil 19b is brought into a non-energizing condition, the N pole of the magnet rotor 19c is abstracted to the a-side of the energizing coil 19a, so that the magnet rotor 19c becomes stable.

Next, the control step is advanced to an energizing step 2. When energizing conditions as to both the a-side of the energizing coil 19a and the b-side of the energizing coil 19b are controlled in such a manner that both the a-side and the b-side commonly become S poles with the same magnetic force, the magnet rotor 19c is rotated by 15 degrees from the position when this magnet rotor 19c is located in the energizing step 1 to another position where the magnet rotor 19c becomes stable.

Subsequently, when each energizing condition as to the a-side of the energizing coil 19a and the b-side of the energizing coil 19b is controlled to be brought into such conditions, namely, a non-energizing condition, S pole (energizing step 3)→N pole, S pole (energizing step 4)→N pole, non-energizing condition (energizing step 5)→N pole, N pole (energizing step 6)→non-energizing condition, N pole (energizing step 7)→S pole, N pole (energizing step 8), the magnet rotor 19c is rotated every 15 degrees along the plus direction Y2 in response to the changes of the energizing conditions. When the energizing conditions as to the energizing coils 19a and 19b are controlled from the energizing step 8 to the energizing condition defined in the above-described energizing step 1, the magnet rotor 19c is again rotated by an angle of 15 degrees along the plus direction Y2 to become stable.

It should also be noted that in the energizing steps 2, 4, 6, 8, at which both the energizing coils 19a and 19b are energized, the magnetic force of both the energizing coils 19a and 19b is controlled so as to become equal to each other.

As a consequence, when the energizing conditions of the energizing coils 19a and 19b are repeatedly controlled based upon the energizing patterns different from each other, which are constructed of a plurality of energizing steps 1→2→ - - - 8, the magnet rotor 19c is rotated one step by one step every the angle of 15 degrees along the plus direction Y2. In conjunction with the rotation of the rotor 19c, the indicator 17 is also rotated along the plus direction Y2 at the rotation angle in response to the deceleration ratio of the gear trains 21 and 23.

In this example, the description has been made as follows. That is, since the energizing conditions of the energizing coils 19a and 19c are controlled based upon the energizing patterns constituted by these 8 energizing steps, the magnet rotor 19c is rotated one step by one step every the angle of 15 degrees along the plus direction Y2. Alternatively, intermediate energizing steps maybe inserted among the respective energizing steps 1 to 8.

In such an alternative case, for instance, such an energizing step 7' (not shown) may be alternatively inserted between the energizing step 7 and the energizing step 8, while this energizing step 7' defines such energizing conditions that the a-side of the energizing coil 19a becomes the S pole, the b-side of the energizing coil 19b becomes the N pole, and magnetic force of the energizing coil 19a becomes equal to "$1/\sqrt{2}$" of magnetic force of the energizing coil 19b.

Since the energizing conditions are controlled in accordance with the above-explained manner, the magnetic force exerted when the a-side of the energizing coil 19a abstracts the N pole of the magnet rotor 19c is smaller than the magnetic force exerted when the b-side of the energizing coil 19b abstracts the S pole of the magnet rotor 19c, so that the above-described absorption force may become balance, and thus, the magnet rotor 19c is brought into a stable condition at a position where the magnetic rotor 19c is rotated from the position of the energizing step 7 to this position by an angle of 7.5 degrees along the plus direction Y2 (namely, such a position the magnetic rotor 19c is rotated from position of energizing step 8 by angle of 7.5 degrees along minus direction Y1).

As a consequence, if such an intermediate energizing step as the above-described energizing step 7' is also inserted among the other energizing steps 1 to 8, and the energizing conditions of the energizing coils 19a and 19b are controlled based upon the energizing pattern which is constituted by the 16 energizing steps, then the magnet rotor 19c may be rotated every 1 step by the angle of 7.5 degrees along the plus direction Y2.

In other words, a rotation angle of the magnet rotor 19c every 1 step may be set based upon a total energizing step number for constituting energizing patterns.

In order to rotate the magnet rotor 19c along the minus direction Y1, the energizing conditions of the energizing coils 19a and 19b may be simply controlled based upon an inverse energizing pattern which is opposite to the above-explained energizing pattern such as the steps 8→7, - - - , →1. In this alternative case, if such an intermediate energizing step as the above-described energizing step 7' is also inserted among the other energizing steps 1 to 8, then the magnet rotor 19c may be rotated every 1 step by the angle of 7.5 degrees along the minus direction Y1.

Figure 5:
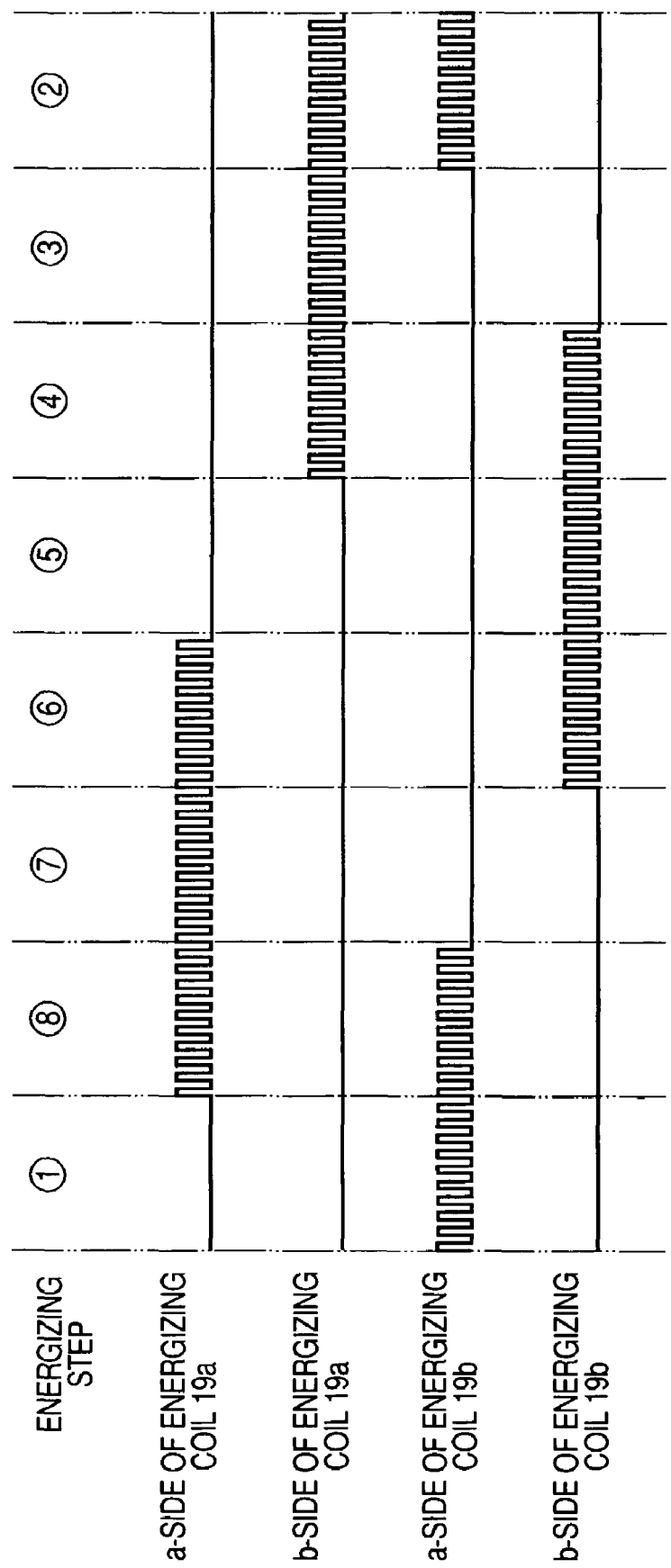
FIG. 5 is a timing chart for indicating an example of energizing pulses outputted by a microcomputer of FIG. 3.

As an example, FIG. 5 shows patterns of energizing pulses which are entered into the respective energizing coils 19a and 19b in the above-described energizing steps 1 to 8.

It should be also noted that in FIG. 5, similar to FIG. 4, numerals "1" to "8" indicative of energizing steps are expressed by circling all of these numerals in FIG. 5.

As previously explained, the pointer 17 which is rotated along either the plus direction Y2 or the minus direction Y1 based upon he changes in the energizing conditions of the energizing coils 19a and 19b is rotated along the minus direction Y until the pin 23a of the gear train 23 abuts against the stopper 31 provided on the side of the housing during a reset operation (will be explained later). In this case, a basic idea for detecting that the rotation of the pointer 17 is stopped in connection with the abutting operation of the pin 23a with respect to the stopper 31 is given as follows:

First, in the case that the pointer 17 through the magnet rotor 19c are rotated along the minus direction Y1 in order to cause the pin 23a to abut against the stopper 31, while the magnet rotor 19c is rotated, induction voltages are produced in the energizing coils 19a and 19b which are brought into the non-energizing conditions, whereas when the rotation of the magnet rotor 19c is stopped, no induction voltage is produced in the energizing coils 19a and 19b under the non-energizing condition.

Therefore, as shown in FIG. 5, in the energizing steps 1, 3, 5, 7, in which any one of the energizing coils 19a and 19b is brought into the non-energizing condition, voltages across both the terminals of the respective energizing coils 19a and 19b under the non-energizing condition are detected.

Figure 6A:
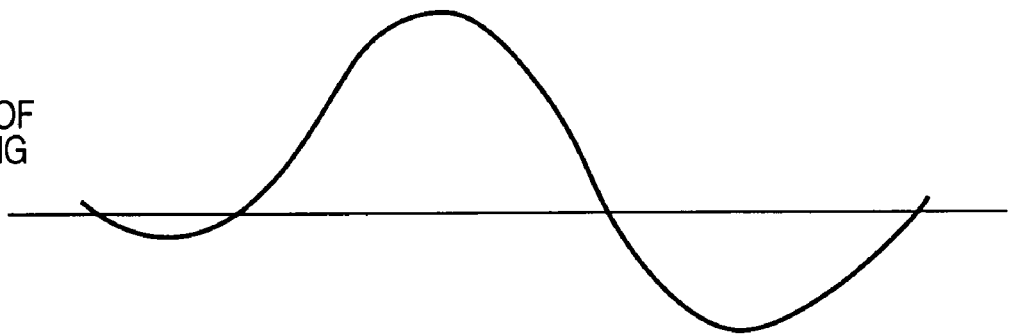
FIGS. 6A and 6B are timing charts of voltages which are generated between the energizing coils of FIG. 3 under non-energizing conditions.

Then, if a detected voltage of both the terminals represents such a waveform as shown in FIG. 6(a), and further, a production of such an induction voltage higher than a predetermined level may be recognized from this waveform shape, then such a fact may be recognized that the pin 23a does not abut against the stopper 31, and the pointer 17 through the magnet rotor 19c are still under rotation.

Figure 6B:

On the other hand, if a detected voltage across both the terminals represents such a waveform as shown in FIG. 6(b), and a production of an induction voltage cannot be completely, or substantially recognized from this waveform shape (namely, if only production of induction voltage having level lower than, or equal to predetermined level is recognized), then such a condition that the pin 23a abuts against the stopper 31 and the rotations of the pointer 17 to the magnet rotor 19c are stopped can be recognized.

Similarly, as shown in FIG. 5, in the energizing steps 2, 4, 6, 8, in which both the energizing coils 19a and 19b are not under non-energizing condition, a voltage across both the terminals as to either any one or both the energizing coils 19a and 19b is detected during an OFF terminal of an energizing pulse.

Figure 7A:
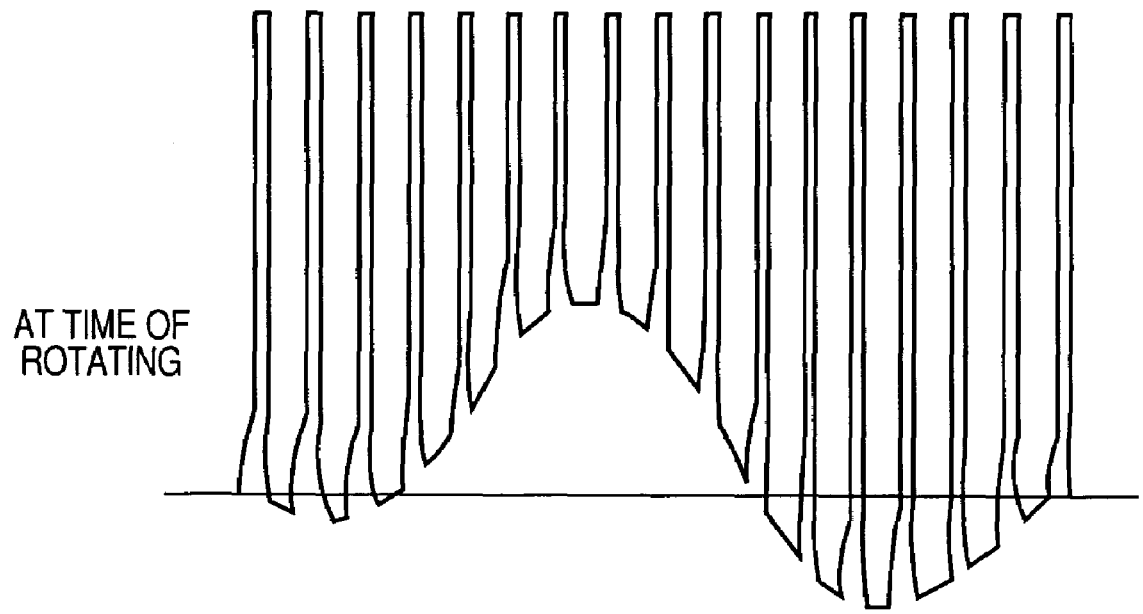
FIGS. 7A and 7B are timing charts of voltages which are generated between the energizing coils of FIG. 3 under energizing conditions during OFF period of energizing pulses.

Then, if a detected voltage of both the terminals represents such a waveform as shown in FIG. 7(a), and further, a production of such an induction voltage higher than a predetermined level maybe recognized from this waveform shape, then such a fact may be recognized that the pin 23a does not abut against the stopper 31, and the pointer 17 to the magnet rotor 19c are still under rotation.

Figure 7B:
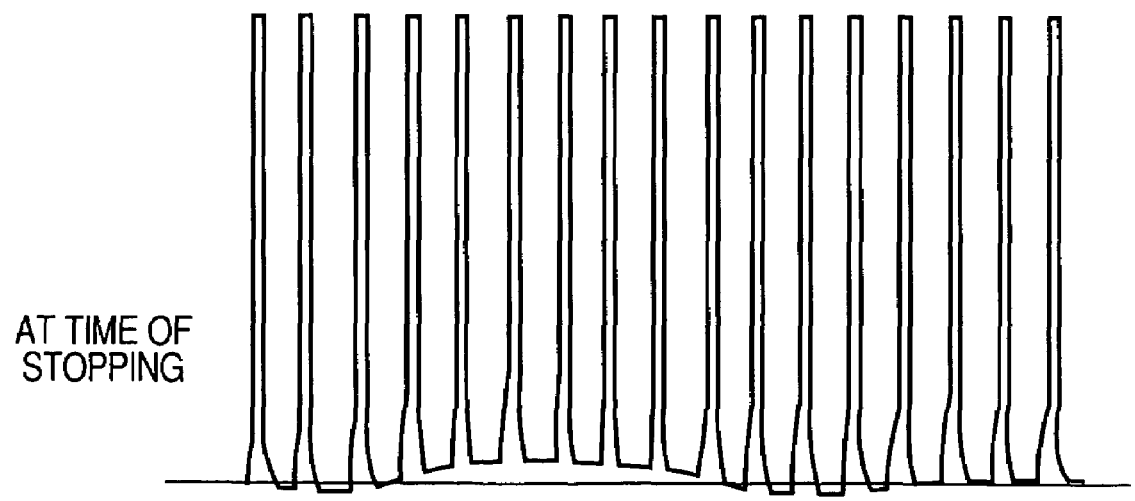

On the other hand, if a detected voltage across both the terminals represents such a waveform as shown in FIG. 7(b), and a production of an induction voltage cannot be completely, or substantially recognized from this waveform shape (namely, if only production of induction voltage having level lower than, or equal to predetermined level is recognized), then such a condition that the pin 23a abuts against the stopper 31 and the rotations of the pointer 17 to the magnet rotor 19c are stopped can be recognized.

Returning back to the arrangement of the pointing apparatus, as indicated in FIG. 3, the μCOM 25 employed in the pointing apparatus according to this embodiment mode contains a central processing unit (CPU) 25a, a ROM 25b, a RAM 25c, and the like, which are mutually connected to each other by a bus line (not shown). The central processing unit 25c executes various sorts of process operations in according to with a program. The ROM 25b corresponds to a read-only memory which has stored thereinto a processing program and the like, which are executed by the CPU 25a. The RAM 25c corresponds to a readable/writable memory which owns a work area used in various sorts of process steps in the CPU 25a, and a data storage area used to store thereinto various sorts of data.

Figure 8:
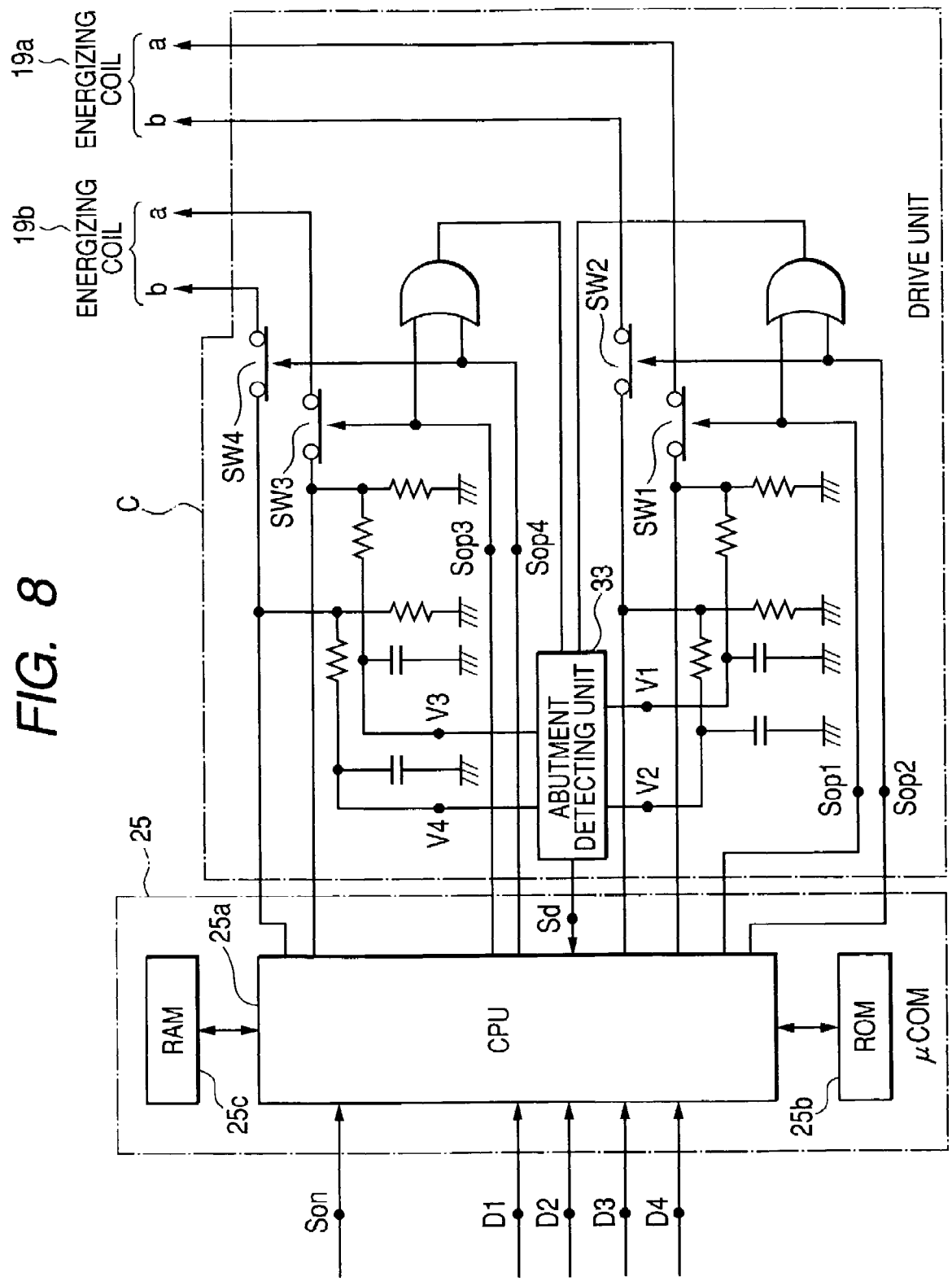
FIG. 8 is a circuit diagram for partially showing a detailed content of a drive unit of FIG. 3 by using a block.

Each of the above-described drive units "C" which is employed in each of the speed indicator 3, the engine tachometer 5, the fuel meter 7, and the radiator water temperature meter 9 is partially indicated by a block in a circuit diagram of FIG. 8. This drive unit C is equipped with switches SW1 and SW2 provided on connection lines for connecting both terminals of the first energizing coil 19a and the μCOM 25; and switches SW3 and SW4 provided on connection lines for connecting both terminals of the second energizing coil 19b and the μCOM 25.

While control terminals (not shown) of these switches SW1 to SW4 are connected to the μCOM 25 respectively, the respective switches SW1 to SW4 are brought into open conditions when open signals "Sop1" to "Sop4" are supplied from the μCOM 25 to the above-described control terminals.

Then, when the above-described switch SW1 is opened, the a-side of the first energizing coil 19a is opened; when the switch SW2 is opened, the b-side of the first energizing coil 19a is opened; when the above-described switch SW3 is opened, the a-side of the second energizing coil 19b is opened; and when the switch SW4 is opened, the b-side of the second energizing coil 19b is opened.

Each of the drive units C is provided with an abutment detecting circuit 33, while a voltage V1 generated on the a-side of the first energizing coil 19a, a voltage V2 generated on the b-side of the first energizing coil 19a, a voltage V3 generated on the a-side of the second energizing coil 19b, a voltage V4 generated on the b-side of the second energizing coil 19b, an OR-gated output between the open signals Sop1 and Sop2 of the switches SW1 and SW2, and another OR-gated output between the open signals Sop3 and Sop4 of the switches SW3 and SW4 are entered to the abutment detecting circuit 33.

Based upon the basic idea which has been previously explained with reference to FIG. 5 to FIG. 7, this abutment detecting circuit 33 detects such a condition that the pin 23a of the gear train 23 abuts against the stopper 31 and thus the rotation of the magnet rotor 19c is mechanically stopped in accordance with the following manner. That is, the abutment detecting circuit 33 compares both the voltage V1 and the voltage V2 with predetermined threshold values. These voltages V1 and V2 are generated in the first energizing coil 19a, either one terminal or both terminals of which might be opened, while such a judgement is made that at least one of the switch SW1 and the switch SW2 is opened based upon the OR-gated output between the open signals Sop1 and Sop2 of the switches SW1 and SW2.

Based upon the basic idea which has been previously explained with reference to FIG. 5 to FIG. 7, this abutment detecting circuit 33 detects such a condition that the pin 23a of the gear train 23 abuts against the stopper 31 and thus the rotation of the magnet rotor 19c is mechanically stopped in accordance with the following manner. That is, the abutment detecting circuit 33 compares both the voltage V3 and the voltage V4 with predetermined threshold values. These voltages V3 and V4 are generated in the second energizing coil 19b, either one terminal or both terminals of which might be opened, while such a judgement is made that at least one of the switch SW3 and the switch SW4 is opened based upon the OR-gated output between the open signals Sop3 and Sop4 of the switches SW3 and SW4.

It should also be understood that the abutment detecting circuit 33 is arranged as follows: That is, if the abutment detecting circuit 33 detects such a fact that the rotation of the magnet rotor 19c is mechanically stopped in accordance with the above-explained manner, then this abutment detecting circuit 33 outputs a detection signal "Sd" having an H level with respect to the μCOM 25. Such an abutment detecting circuit 33 may be constructed by combining a comparator with a logic circuit, and the like.

While the above-explained μCOM 25 executes the normal operation, as indicated in FIG. 3, the μCOM 25 calculates a move amount "?-?" equal to a difference between a target position "?" corresponding to the pointing position of each of the corresponding pointers 17 and a present position "?" of each of the pointers 17 based upon a measurement value of each of the above-described sensors, which is calculated every a constant time period from the signals D1 to D4 acquired from the respective sensors. In the normal operation, the pointers 17 are driven in such a manner that the pointers 17 point out the corresponding scale positions on the scales 15 as to the speed indicator 3, the engine tachometer 5, the fuel meter 7, and the radiator water temperature meter 9 in response to the measurement values acquired by the speed sensor, the engine revolution sensor, the remaining fuel sensor, and the temperature sensor, which are not shown in the drawing.

Then, the μCOM 25 produces energizing patterns of the first and second energizing coils 19a and 19b, while these energizing patterns are produced in order to rotate the magnet rotor 19c only by such an angle (namely, step numbers) equal to the calculated move amount "?-?" of the pointer 17. The μCOM 25 separately outputs energizing pulses responding to these energizing patterns with respect to the corresponding first and second energizing coils 19a and 19b of the stepper motor 19.

As previously explained, during the normal operation, the μCOM 25 controls energizing conditions of the first and second energizing coils 19a and 19b of each of the stepper motors 19 based upon the outputted energizing pulses in such a manner that these energizing conditions are sequentially changed from the corresponding energizing step among the above-described energizing steps 1 to 8. As a result, the μCOM 25 controls to rotate each of the pointers 17 along either the plus direction Y2 or the minus direction Y1 by only the move amount "?-?" in response to change amounts of the signals D1 to D4 supplied from the corresponding sensors, so that the respective pointers 17 point out target positions "?" in response to the measurement values of the sensors corresponding thereto.

It should also be noted that a present pointing position of each of the pointers 17 in view of the calculation is always grasped by the μCOM 25 by way of, for example, a mode of step numbers of the stepper motor 19 which is acquired based upon the output content of the above-described energizing pulses.

On the other hand, there are some cases that a shift may be produced between an actual pointing position of each of the pointers 17 and a present pointing position of each of the pointers 17 in view of calculation, which is grasped by the μCOM 25 due to a loss of synchronism as to the stepper motor 19. In an actual case, when such a shift between the actual pointing position and the present pointing position is produced, the following case may occur. That is, the respective pointers 17 of the speed indicator 3, the engine tachometer 5, the fuel meter 7, and the radiator water meter 9, which should be returned to such positions where these pointers 17 point out zeroes on the scales 15 when an ignition switch is turned OFF, are not returned to such positions where these pointers 17 point out zeroes on the scales 15.

Then, when such a case happens to occur, the μCOM 25 which has still recognized such positions that the pointers 17 were returned when the ignition switch was turned OFF as the positions where the pointers pointed out zeroes on the scales 15 is tried to rotate the respective pointers to positions in response to measurement values of the respective sensors after the ignition switch is turned ON. If so, then the occurrence such a shift is left. This shift is produced between the actual pointing position of each of the pointers 17 and the present pointing position of each of the pointers 17 in view of calculation, which is grasped by the μCOM 25. As a consequence, the speed indicator 3, the engine tachometer 5, the fuel meter 7, and the radiator water meter 9 cannot display the correct values.

Under such a circumstance, in the pointing apparatus which has been assembled in the vehicle-purpose display apparatus according to this embodiment mode, both a reset operation and a correcting operation are carried out under control of the μCOM 25 with respect to the respective pointers 17. In the reset operation, the pointer 17 is rotatably moved along the minus direction Y1 until the pin 23 of the gear train 23 abuts against the stopper 31 and the rotations of the pointer 17 through the magnet rotor 19c are stopped when the ignition switch is turned ON. In the correcting operation, the pointer 17 is rotatably moved along the plus direction Y2 in order that the pointer 17 is actually positioned at a reference pointing position where this pointer 17 points out zero on the scale 15.

Since both the reset operation and the correcting operation are carried out when the ignition switch is turned ON, even if the shift between the pointing position of each of the pointers 17 in view of calculation and the actual pointing position thereof has been produced due to the loss of synchronism of the stepper motor 19 before this ignition switch is turned ON, then this shift can be reset. The above-described pointing positions of the respective pointers 17 in view of calculation are grasped by the μCOM 25.

Then, in the pointing apparatus which has been assembled in the vehicle-purpose display apparatus according to this embodiment mode, the above-described reset operation is carried out by that the abutment detecting circuit 33 detects such a condition that the pin 23a of the gear train 23 abuts against the stopper 31 and thus the rotation of the magnet rotor 19c is mechanically stopped based upon the basic idea which has been previously explained with reference to FIG. 5 through FIG. 7.

In order that the above-explained correcting operation can be carried out, in the pointing apparatus assembled in the vehicle-purpose display apparatus according to this embodiment mode, such energizing patterns (namely, any of energizing steps 1 to 8 explained with reference to FIG. 4) of the first energizing coil 9a and the second energizing coil 9b have been previously stored in the above-described NVM 29 (corresponding to reference pointing position storage means) with respect to each of the pointers 17 as reference pointing positional information indicative of a reference pointing position of each of the pointers 17. The energizing patterns of these first and second coils 19a and 19b are employed so as to position the magnet rotor 19c at such a rotation position when the pointer 17 is located at the reference pointing position for pointing zero on the scale 15.

It should also be noted that the energizing patterns of the first energizing coil 19a and the second energizing coil 19b, which are equal to the reference pointing positional information of each of the pointers 17, are determined at a time instant after the pointer 17 has been driven in (mounted on) the pointer shaft (not shown) which penetrates the center of the gear train 23 and before the vehicle-purpose display apparatus is shipped. Then, the determined energizing patterns are written in the NVM 29.

Then, a content of energizing patterns with respect to each of the pointers 17 as the reference pointing positional information may be determined by that while the pointer 17 is actually located at the reference pointing position for pointing zero on the scale 15, energizing patterns of the first and second energizing coils 19a and 19b are calculated, which are used to position the magnet rotor 19c on the rotation position at this time.

By the way, the energizing patterns of the first and second energizing coils 19a and 19b, which have been previously stored in the NVM 29 with respect to each of the pointers 17, are employed so as to define a specific rotation position within one electric cycle of the magnet rotor 19c. For example, the previously stored energizing patterns of the first and second energizing coils 19a and 19b are also made coincident with such energizing patterns of the first and second energizing coils 19a and 19b, which are used to position the pointer 17 to such a position which is rotatably moved along the plus direction Y2 by one electric cycle of the magnet rotor 19c from the reference positioning position where the pointer 17 points out zero on the scale 15, so that the energizing patterns never indicate an absolute position of the pointer 17.

However, a rotation amount of each of the pointers 17 in the correcting operation from the position where the pin 23a abuts against the stopper 31 and thus the rotation of the magnet rotor 19c is stopped up to the reference pointing position where the pointer 17 points out zero on the scale 15 is merely a sufficiently smaller amount than one electric cycle of the magnet rotor 19c.

As a result, even when such energizing patterns of the first and second energizing coils 19a and 19b are employed to define the specific rotation position within the one electric cycle of the magnet rotor 19c, no problem may occur. These energizing patterns have been previously stored in the NVM 29, and are used to position the magnet rotor 19c at such a rotation position when the pointer 17 is located at the reference pointing position where the pointer 17 points out zero on the scale 15.

A step value indicative of a reset operation starting position has been previously and separately stored as reset operation starting positional information with respect to each of the pointers 17 in the above-explained NVM 27 (corresponding to resetting starting position storage means). This reset operation starting position corresponds to a rotation move target position of the pointer 17 which is rotatably moved under control of the μCOM 25 (will be explained later) in a prereset operation which is executed prior to the above-explained reset operation when the ignition switch is turned ON.

It should also be understood that the step value corresponding to the reset operation starting positional information every pointer 17 is determined at a time instant after the pointer 17 has been driven in (mounted on) the pointer shaft (not shown) which penetrates the center of the gear train 23 and before the vehicle-purpose display apparatus is shipped, and then the determined step value is written in the NVM 27 in a similar manner as to the energizing patterns of the first energizing coil 19a and the second energizing coil 19b which have been previously stored in the NVM 29 as the reference pointing positional information of each of the pointers 17.

Then, the content of the step value every pointer 17 as the reset operation starting positional information is determined as follows: That is, while the pin 23a of the gear train 23 abuts against the stopper 31 and thus the rotations of the pointer 17 through the magnet rotor 19c are stopped, the pointer 17 through the magnet rotor 19c are rotated by a predetermined rotation amount from this stop position along the plus direction Y2 of the scale 15, and a step number of the stepper motor 19 at this time is calculated.

Next, referring to flow charts of FIG. 9 to FIG. 11, a driving process operation executed by the CPU 25a will now be explained. That is to say, in accordance with a program stored in the ROM 25b, this CPU 25a separately executes the driving process operation with respect to each of the stepper motors 19 employed for the speed indicator 3, the engine tachometer 5, the fuel meter 7, and the radiator water temperature meter 9.

Figure 9:
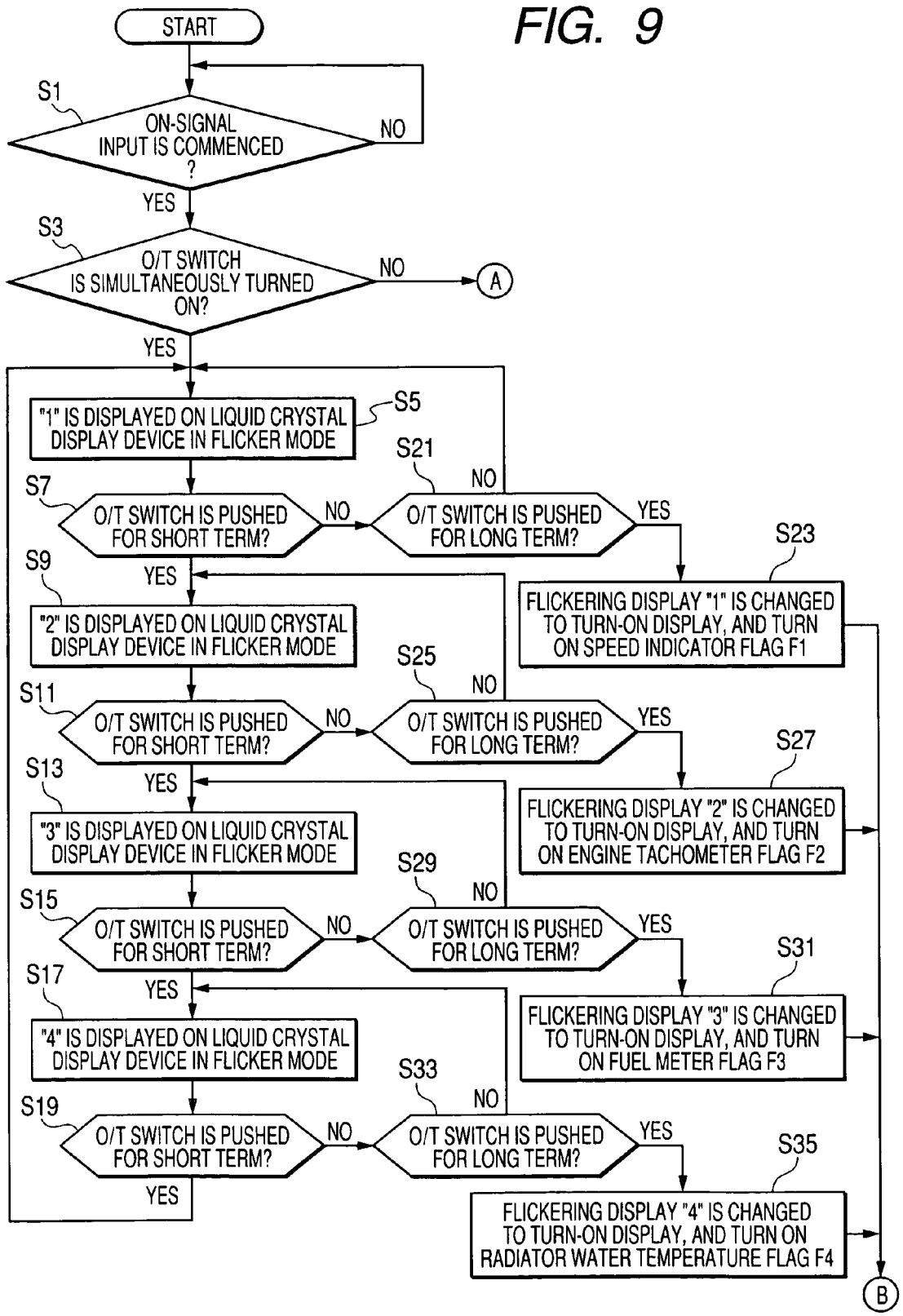
FIG. 9 is a flow chart for describing a process operation executed by a CPU in accordance with a control program stored in a ROM of the microcomputer shown in FIG. 3.

First, as shown in the flow chart of FIG. 9, the operation of the vehicle-purpose display apparatus is initiated by starting a supply of electric power from a battery (not shown). In an initial step (not shown), initial setting operation as to various sorts of storage areas formed in the RAM 25c within the μCOM 25 is carried out. Initializations as to each of the pointer 17 through the stepper motor 19 are carried out by that each of the pointers 17 employed for the speed indicator 3, the engine tachometer 5, the fuel meter 7, and the radiator water temperature meter 9 are controlled in such a way that the pointing position of the pointer 17 in view of calculation, which has been grasped by the μCOM 25, becomes the reference pointing position for pointing out zero on the scale 15. Thereafter, the driving process operation is advanced to a first step S1 of this flow chart.

Then, the CPU 25a firstly waits for the driving process operation until an input of an ON signal "Son" is commenced in conjunction with an ON operation of the ignition switch in the step S1 (NO in step S1). When the input of the ON signal Son is commenced (YES in step S1), the CPU 25a judges as to whether or not the O/T switch 13 is turned ON at the same time (step S3). In the case that the O/T switch 13 is not turned ON (NO in step S3), the driving process operation is advanced to a step S65 (will be explained late). In the case that the O/T switch 13 is turned ON (YES in step S3), the pointer 17 is driven in (mounted on) the pointer shaft (not shown) which passes through the center of the gear train 23. Thereafter, the driving process operation is entered to a write mode of the reference pointing positional information to the NV 29 before the vehicle-purpose display apparatus is shipped, and numeral "1" indicative of the speed indicator 3 is displayed on the liquid crystal display device 11 in a flicker mode (step S5).

Thereafter, when the O/T switch 13 is pushed for a short term (YES insteps S7, S11, S15, and S19), the flickering display of the liquid crystal display device 11 is sequentially changed into "2" indicative of the engine tachometer 5, "3" indicative of the fuel meter 7, "4" indicative of the radiator water temperature meter 9, and then, "1" representative of the speed indicator 3 (steps S9, S13, S17, and S5).

Under such a condition that "1" is displayed on the liquid crystal display device 11 in the flicker mode (step S5), when the O/T switch 13 is pushed for a long term (NO in step S7 and YES in step S21), the speed indicator 3 is selected as a subject measuring device for writing the reference pointing positional information of the pointer 17 into the NVM 29, a speed indicator flag "F1" indicative of this device selection is turned ON, and further, the flickering display of "1" of the liquid crystal display device 11 is changed into a turn-ON display (step S23).

Similarly, under such a condition that "2" is displayed on the liquid crystal display device 11 in the flicker mode (step S9), when the O/T switch 13 is pushed for a long term (NO in step S11 and YES in step S25), the engine tachometer 5 is selected as a subject measuring device for writing the reference pointing positional information of the pointer 17 into the NVM 29, an engine tachometer flag "F2" indicative of this device selection is turned ON, and further, the flickering display of "2" of the liquid crystal display device 11 is changed into a turn-ON display (step S27).

Under such a condition that "3" is displayed on the liquid crystal display device 11 in the flicker mode (step S13), when the O/T switch 13 is pushed for a long term (NO in step S15 and YES in step S29), the fuel meter 7 is selected as a subject measuring device for writing the reference pointing positional information of the pointer 17 into the NVM 29, a fuel meter flag "F3" indicative of this device selection is turned ON, and further, the flickering display of "3" of the liquid crystal display device 11 is changed into a turn-ON display (step S31).

Similarly, under such a condition that "4" is displayed on the liquid crystal display device 11 in the flicker mode (step 517), when the O/T switch 13 is pushed for a long term (NO in step S19 and YES in step S33), the radiator water temperature meter 9 is selected as a subject measuring device for writing the reference pointing positional information of the pointer 17 into the NVM 29, a radiator water temperature meter flag "F4" indicative of this device selection is turned ON, and further, the flickering display of "4" of the liquid crystal display device 11 is changed into a turn-ON display (step S35).

After the changing operations to the turn-ON displays and the ON-operations of the flags have been accomplished (steps S23, 527, S31, and S35), the below-mentioned operations are carried out in order that the pointer 17 of the measuring device which has been selected as such a subject device that the reference pointing positional information of the pointer 17 is written into the NVM 29 among the speed indicator 3, the engine tachometer 5, the fuel meter 7, and the radiator water temperature meter 9 is rotated from the present pointing position which has been initialized, namely, from the present pointing position which is recognized by the μCOM 25 as the reference pointing position in view of calculation, up to such a pointing position that the pointer 17 actually points out the reference pointing position.

Figure 10:
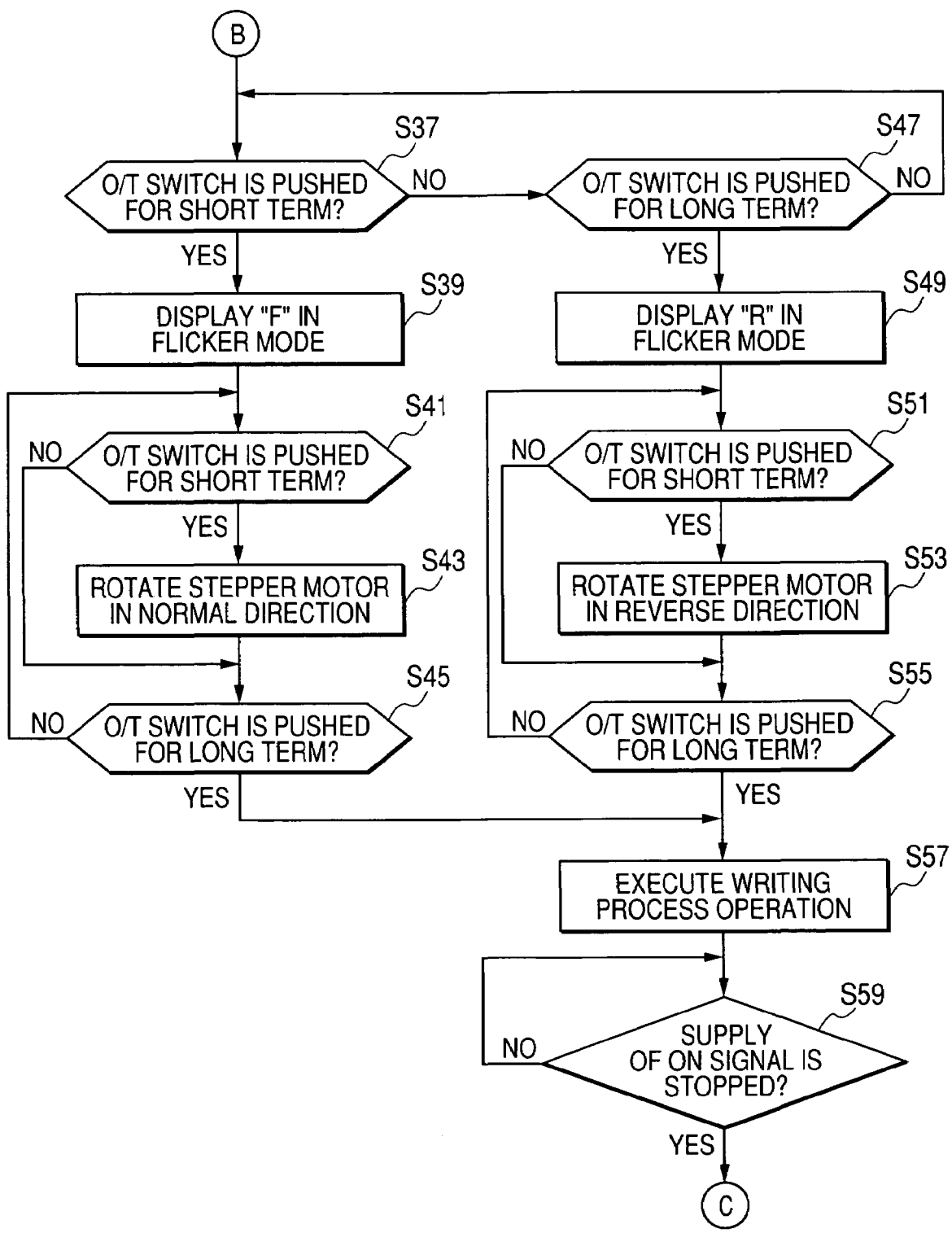
FIG. 10 is a flow chart for describing a process operation executed by the CPU in accordance with the control program stored in the ROM of the microcomputer shown in FIG. 3.

Concretely speaking, as indicated in FIG. 10, in such a case that a pointing position of the pointer 17 is shifted to the side of the minus direction Y1 from the reference pointing position, the O/T switch 13 is pushed for a short term (YES of step S37) so as to display symbol "F" indicative of the plus direction Y2 on the liquid crystal display device 11 in the flicker mode (step S39). Subsequently, the O/T switch 13 is pushed for a short term (YES in step 541) so as to set the rotation direction of the pointer 17 along the plus direction Y2, to change the flickering display "F" of the liquid crystal device 11 into a turn-ON display for indicating such a condition that the rotation direction of the pointer 17 has been set to the plus direction Y2, and further, to rotate the pointer 17 along the plus direction Y2 by 1 step of the stepper motor 19 (step S43).

If the pointing position of the pointer 17 is shifted to the side of the minus direction Y1 as compared with the reference pointing position for pointing out zero on the scale 15, then the O/T switch 13 is again pushed for a short term (NO in step S45 and YES in step S41) so as to rotate the pointer 17 along the plus direction Y2 by 1 step of the stepper motor 19 (step S43).

In the case that the pointing position of the pointer 17 is shifted to the side of the plus direction Y2 as compared with the reference pointing position, the O/T switch 13 is pushed for a long term (NO in step S37 and YES in step S47) so as to display symbol "R" indicative of the minus direction Y1 in the flicker mode (step S49). Subsequently, the O/T switch 13 is pushed for a short term (YES in step S51) so as to set the rotation direction of the pointer 17 along the minus direction Y1, to change the flickering display "R" of the liquid crystal device 11 into a turn-ON display for indicating such a condition that the rotation direction of the pointer 17 has been set to the minus direction Y1, and further, to rotate the pointer 17 along the minus direction Y1 by 1 step of the stepper motor 19 (step S53).

If the pointing position of the pointer 17 is shifted to the side of the minus direction Y2 as compared with the reference pointing position for pointing out zero on the scale 15, then the O/T switch 13 is again pushed for a short term (NO in step S57 and YES in step S51) so as to rotate the pointer 17 along the minus direction Y1 by 1 step of the stepper motor 19 (step S53).

Then, if the pointing position of the pointer 17 becomes the reference pointing position, then the O/T switch 13 is pushed for a long term (YES in step S45 and YES in step S55) so as to write the present energizing patterns of the first and second energizing coils 19a and 19b into the NVM 29 as the reference pointing positional information (step 557). After the CPU 29a waits for a stop of entering the ON signal Son produced in connection with turning OFF of the ignition switch (YES in step S59), the CPU 29a accomplishes the process operation.

Although not described in the flow charts of FIG. 9 and FIG. 10, a writing operation of the reset operation starting positional information into the NVM 27, which is executed before the vehicle-purpose display apparatus is shipped, maybe carried out in accordance with process operations similar to those defined from the step S5 to the step S59.

In this case, it should be understood that the setting point of the pointing position of the pointer 17 by manipulating the O/T switch 13 is to set to the reference pointing position, but to such a position that the pin 23a of the gear train 23 abuts against the stopper 31 and thus the rotations of the pointer 17 through the magnet rotor 19c are stopped. Every time the pointer 17 is rotated by 1 step along either the minus direction Y1 or the plus direction Y2 by manipulating the O/T swtich 13, the pointing position of the pointer 17 in view of calculation, which is recognized by the μCOM 25, is increased, or decreased, namely, a count value "K" of a correction amount counter provided in the RAM 25c, which indicates a step number of the stepper motor 19, is decremented by "1" (in case of minus direction Y1), or incremented by "1" (in case of plus direction Y2).

Then, if the pin 23a abuts against the stopper 31 and the pointer 17 is rotatably moved to such a position that the rotations of the pointer 17 through the magnet rotor 19c is stopped, then such a value (incremented) defined by adding a predetermined value to the present count value "K" of the correction amount counter is calculated as a pointing position of the pointer 17 in the case that the pointer 17 through the magnet rotor 19c are rotated by a predetermined amount from the rotation stopping position along the plus direction Y2, namely, such a count value K equivalent to the step number of the stepper motor 19. This calculated count value K is written as the reset operation starting positional information into the NVM 27, and the CPU 29a may wait for a stop of entering the ON signal Son in connection to turning ON of the ignition switch so as to accomplish the writing operation.

Figure 11:
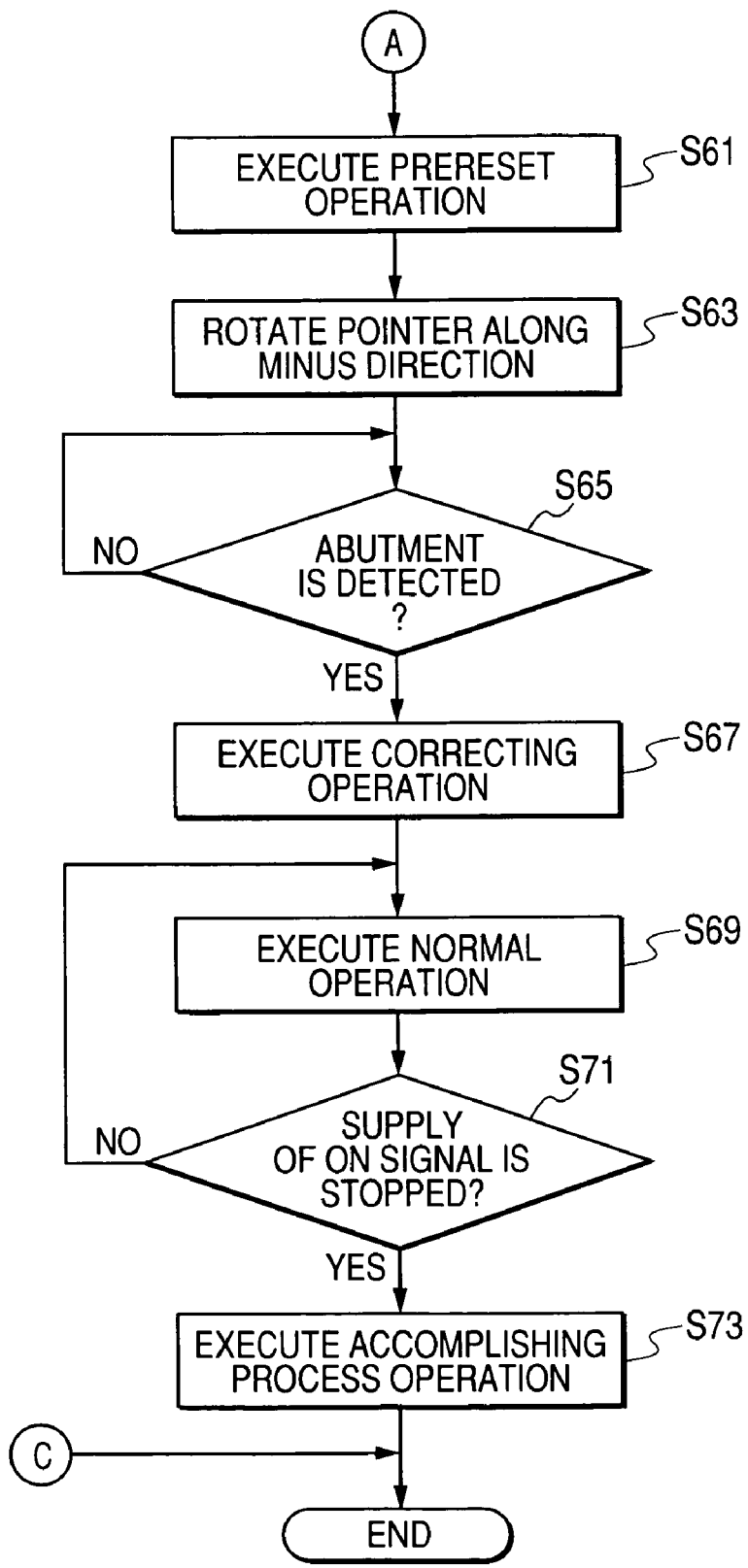
FIG. 11 is a flow chart for describing a process operation executed by the CPU in accordance with the control program stored in the ROM of the microcomputer shown in FIG. 3.
Figure 12:
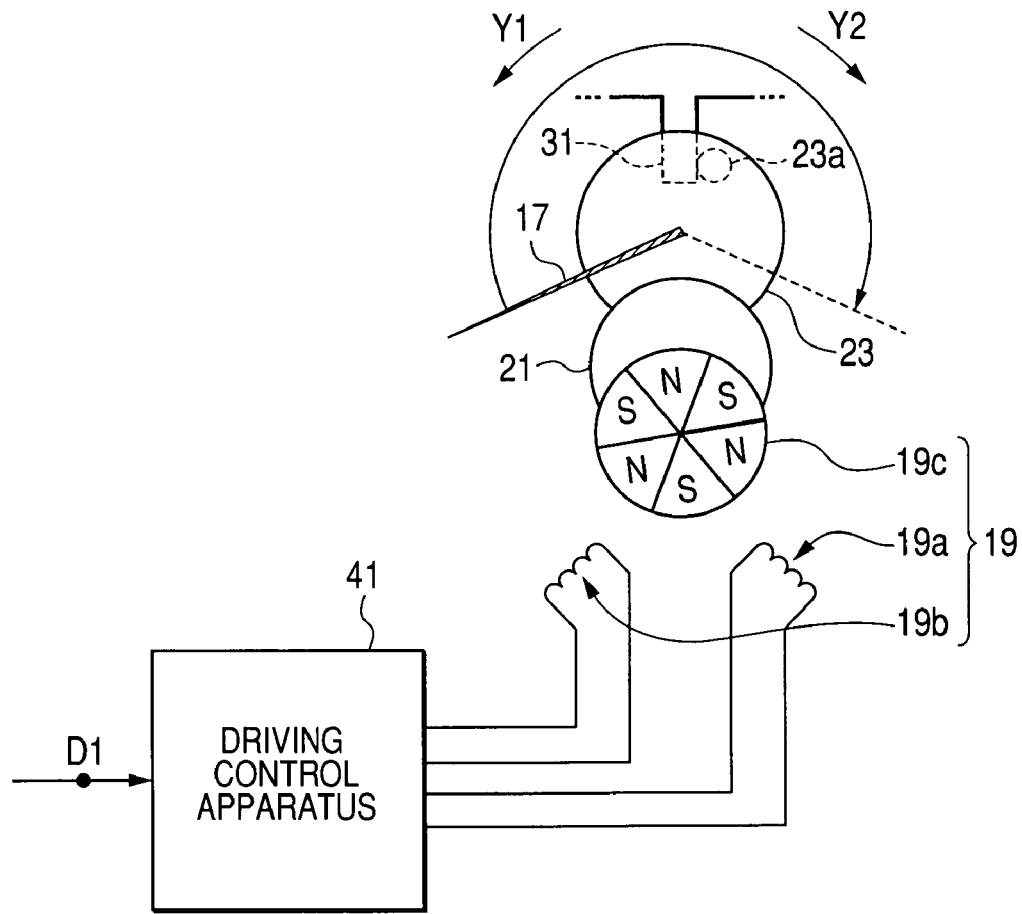
FIG. 12 is a diagram for indicating one example of the pointing apparatus into which the conventional pointing position correcting apparatus has been assembled.
Figure 13:
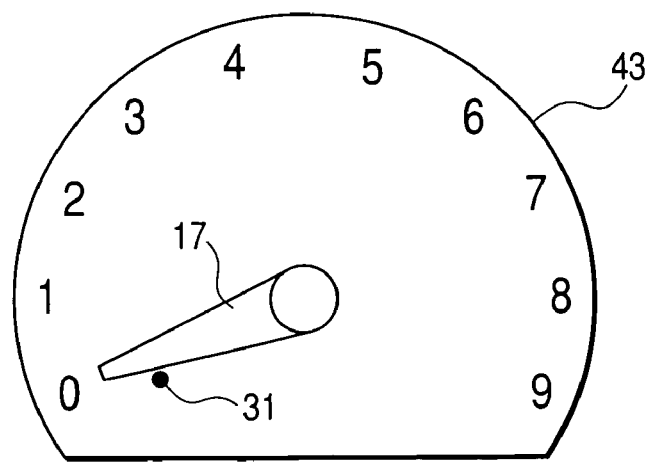
FIG. 13 is a diagram for showing the outer view of the pointing apparatus into which the conventional pointing position correcting apparatus has been assembled.

Returning again to the description of the flow chart, in the case that the O/T switch 13 is not turned ON at the same time at the time instant when the input of the ON signal "Son" in connection with turning ON of the ignition switch is commenced (NO in step S3), as shown in FIG. 11, a prereset operation is carried out (step S61). In the prereset operation, the pointer 17 is rotatably moved to such a position corresponding to the step value which has been stored as the reset operation starting positional information into the NVM 27, namely, such a reset operation starting position which is shifted by a constant amount from the pointing position of each of the pointers 17 along the plus direction Y2, at which the pin 23a of the gear train 23 abuts against the stopper 31 and thus the rotations of the pointer 17 through the magnet rotor 19c are stopped (step S61).

As a consequence, the μCOM 25 may function as a prereset means 25A defined in claims by this prereset operation.

It should also be noted that contents of reset operation starting positional information stored in the NVM 27 are different from each other with respect to these pointers 17 for the speed indicator 3, the engine tachometer 5, the fuel meter 7, and the radiator water temperature meter 9, reset operation starting positions of the respective pointers 17 which are rotatably moved by executing the prereset driving process operation are also different from each other.

If the reset operation starting positions are different from each other, or if pointing positions of the respective pointers 17 just before the process operation is entered to the prereset operation are different from each other, then time instants when the respective pointers 17 are reached to the reset operation starting positions are apparently different from each other.

In such a case that the time instants when the respective pointers 17 are reached to the reset operation starting positions are different from each other, as previously explained, since the driving control operation of the stepper motor 19 by the μCOM 25 is separately carried out with respect to each of the speed indicator 3, the engine tachometer 5, the fuel meter 7, and the radiator water temperature meter 9, such a pointer 17 which has been first of all reached to the reset operation starting position is advanced to a next reset operation without waiting that another pointer 17 which has not yet been reached to the reset operation starting position is reached to this reset operation starting position.

When the prereset operation is ended, the energizing patterns of the first and second energizing coils 19a and 19b are changed until these energizing patterns become such energizing patterns functioning as the reference pointing positions as to this pointer 17, which have been stored in the NVM 29 in such a manner that until a signal level of a detection signal "Sd" entered from the abutment detecting circuit 33 is inverted from an L level to an H level (NO in step S65), the pointer 17 is rotated along the minus direction Y1 (step S63), and if the pin 23a of the gear 23 abuts against the stopper 31, the rotations of the pointer 17 through the magnet rotor 19c are stopped, and the signal level of the detection signal Sd entered from the abutment detecting circuit 33 is inverted from the L level to the H level (YES in step S65), then the pointer 17 is rotated along the plus direction Y2. Thus, the respective pointers 17 are rotatably moved along the plus direction Y2 up to the reference pointing positions (step S67).

As a consequence, the respective pointers 17 may be arranged on the reference pointing positions for pointing out zeroes on the respective scales 15.

In other words, since the above-described process operations defined from the step S63 to the step S65 are carried out, the reset operations of the respective pointers 17 are performed, and also, since the above-described process operation defined by the step S67 is carried out, the correcting operations of the respective pointers 17 are carried out.

Then, a normal operation is carried out in which as to the pointers 17 which have been reached to the reference pointing positions, thereafter, until the input of the ON signal Son is executed in connection with turning OFF of the ignition switch (NO in step S71), the energizing pulses produced based upon the change amounts of the sensor signals D1 to D4 which are entered from the respective sensors every time a constant time period has elapsed are outputted to the first and second energizing coils 19a and 19b of the corresponding stepper motor 19 so as to cause the respective pointers 17 to point out target positions "?" in response to the measurement values of the corresponding sensors (step S69).

Furthermore, after the normal operation has been commenced, an accomplishing process operation is carried out (step S73), and thereafter, the process operation is accomplished. In this accomplishing process operation, when the input of the ON signal Son executed in connection with turning ON of the ignition switch is stopped (YES in step S71), such a rotation amount is calculated with respect to each of the pointers 17, and then, each of the pointers 17 is rotated along the minus direction Y1 only by this calculated amount. This rotation amount is required for changing from the present position, the pointing position of each of the pointers 17 in view of calculation which has been grasped by the μCOM 25 into such a position corresponding to the step value which has been stored as the reset operation starting positional information into the NVM 27, namely, such a reset operation starting position which is shifted by a constant amount from the pointing position of each of the pointers 17 along the plus direction Y2, at which the pin 23a of the gear train 23 abuts against the stopper 31 and thus the rotations of the pointer 17 through the magnet rotor 19c are stopped.

There are some possibilities that as to such a pointer 17 whose prereset operation has been firstly accomplished to firstly commence the reset operation, this reset operation is first of all ended as compared with other pointers 17, and then, the first-mentioned pointer 17 is reached to the pointing position where the pin 23a abuts against the stopper 31 so as to stop the rotation. Similarly, there are some possibilities that as to a pointer 17 whose reset operation has been firstly accomplished to firstly commence the correcting operation, this correcting operation is first of all ended as compared with other pointers 17, and then, the first-mentioned pointer 17 is reached to the pointing position.

As previously explained, also, in such a case that there are different time instants when the respective pointers 17 are reached to the pointing positions where the pins 23a abut against the stoppers 31 so as to stop the rotations of these pointers 17, and the respective pointers 17 are reached to the reference pointing positions, similar to such a case that the time instants when the respective pointers 17 are reached to the reset operation starting positions are different from each other, since the driving control operation of the stepper motor 19 by the μCOM 25 is separately carried out with respect to each of the speed indicator 3, the engine tachometer 5, the fuel meter 7, and the radiator water temperature meter 9, such a pointer 17 whose rotation has been first of all stopped is advanced to a next correcting operation without waiting that the rotation of the pointer 17 is stopped which is still being rotated along the minus direction Y1. Such a pointer 17 which has been first of all reached to the reference pointing position is advanced to a next correcting operation without waiting that the pointer 17 which is still being rotated along the plus direction Y2 is reached to the reference pointing position.

As previously described, in this embodiment mode, the commencement of entering of the ON signal Son executed in connection with turning ON of the ignition switch under such a condition that the O/T switch 13 is not turned ON may constitute a command signal defined in claims. Alternatively, the above-described prereset operation through correcting operation (step S61 through step S67) may be alternatively carried out just after the accomplishing process operation (step S73). In this alternative case, the completions of applying the energizing patterns to the first and second energizing coils 19a and 19b of the stepper motor 19, which occur when the respective pointers 17 have been moved to the reference pointing positions in view of calculation in this accomplishing process operation may constitute the command signal defined in Claims.

As previously explained, in accordance with this embodiment mode, before such a reset operation is carried out in which each of the pointers 17 is rotated up to the pointing position where the pin 23a of the gear train 23 abuts against the stopper 31 so as to stop the rotation of the pointer 17 through the magnet rotor 19c, the prereset operation is carried out in which each of the pointers 17 is forcibly moved to the reset operation starting position which is shifted by a constant amount from the rotation stopping position to the side of the plus direction Y2. As a result, in the case that the rotations of the respective pointers 17 are stopped by employing both the different pins 23a of the different gear trains 23 of the dials 1 having the pointers 17 and the scales 15, even when the mounting positions of the respective pointers 17 own errors and these errors are fluctuated, both the reset operations and the correcting operations which are necessarily performed in order to correctly maintain the pointing precision as to the respective pointers 17 are more quickly carried out, so that the operations of the pointers 17 can be more quickly advanced to the normal operations.

In order to firmly recognize such a fact that the pointer 17 through the magnet rotor 19c which have been once rotated are stopped because the pin 23a of the gear train 23 abuts against the stopper 31, the reset operation starting position for each of the pointers, which is indicated by the reset operation starting positional position previously stored in the NVM 29 may be preferably set to such a position that a sufficiently large rotation amount may be secured so as to generate such an induction voltage having a level higher than a constant level (namely, a predetermined threshold value of abutment detecting circuit 33). This induction voltage is generated between both the terminals of the first and second energizing coils 19a and 19b under non-energizing conditions in the energizing steps 1, 3, 5, 7, or generated at any one, or both of the terminals of the first and second energizing coils 19a and 19b during the OFF periods of the energizing pulses in the energizing steps 2, 4, 6, 8, while the pointer 17 is rotated along the minus direction Y1 from this reset operation starting position up to the position where the pin 23 abuts against the stopper 31 to stop the rotation of the pointer 17.

This embodiment mode has described such an exemplification that the inventive idea of the present invention has been applied to the vehicle-purpose display apparatus having the 4 pointers 17 as to the speed indicator 3, the engine tachometer 5, the fuel meter 7, and the radiator water temperature meter 9, and also, containing the 4 stepper motors 19 for rotating these 4 pointers 17. Alternatively, the present invention may be applied to an indicating apparatus constructed of a single pointer. If such an apparatus that a pointer is rotated by a stepper motor is available, then the present invention may be apparently applied to any apparatus other than a vehicle-purpose display apparatus.

What is claimed is:

1. A method of correcting a pointing position of a pointer rotated by a stepper motor, the method comprising the steps of:

performing a prereset operation in which the pointer is rotated to a reset operation starting position which is indicated by a previously stored reset operation starting positional information, wherein the reset operation starting position represents a pointing position of the pointer which is shifted by a predetermined amount in a plus direction of a scale from a reset position where a pin which is rotated in conjunction with a rotation of the pointer abuts against a fixed stopper;

after the prereset operation, performing a reset operation in which the pointer is rotated in a minus direction of the scale to the reset position; and after the reset operation, performing a correcting operation in which the pointer is rotated in the plus direction up to a reference pointing position which is indicated by previously stored reference pointing positional information.

2. A pointing position correcting apparatus for correcting a pointing position of a pointer rotated by a stepper motor, the pointing position correcting apparatus being adapted to perform:

a prereset operation in which the pointer is rotated to a reset operation starting position which is indicated by a previously stored reset operation starting positional information, wherein the reset operation starting position represents a pointing position of the pointer which is shifted by a predetermined amount in a plus direction of a scale from a reset position where a pin which is rotated in conjunction with a rotation of the pointer abuts against a fixed stopper;

a reset operation in which the pointer is rotated in a minus direction of the scale to the reset position; and a correcting operation in which the pointer is rotated in the plus direction up to a reference pointing position which is indicated by previously stored reference pointing positional information, wherein the reset operation is performed after the prereset operation, and the correcting operation is performed after the reset operation.

3. A pointing apparatus comprising:

a pointer that is rotated by a stepper motor in such a manner that said pointer points out a place corresponding to a measurement amount on a scale;

the stepper motor;

a pin which that is rotated in conjunction with a rotation of the pointer;

a fixed stopper that is adapted to be abutted against the pin; and a pointing position correcting apparatus for correcting a pointing position of the pointer, the pointing position correcting apparatus being adapted to perform:

a prereset operation in which the pointer is rotated to a reset operation starting position which is indicated by a previously stored reset operation starting positional information, wherein the reset operation starting position represents a pointing position of the pointer which is shifted by a predetermined amount in a plus direction of the scale from a reset position where the pin which is rotated in conjunction with a rotation of the pointer abuts against the fixed stopper;

a reset operation in which the pointer is rotated in a minus direction of the scale to the reset position; and a correcting operation in which the pointer is rotated in the plus direction up to a reference pointing position which is indicated by previously stored reference pointing positional information, wherein the reset operation is performed after the prereset operation, and the correcting operation is performed after the reset operation.

4. The pointing apparatus according to claim 3, wherein the stepper motor includes first and second coils that are energized by patterns whose phases are shifted from each other and a magnet rotor that is located opposite to the first and second coils and is connected directly or indirectly to the pointer, the pointer is rotated by controlling the energization of the first and second coils, stopping of the rotation of the pointer in the reset operation is detected by detecting a transition from a condition in which an induction voltage generated by at least one of the first and second coils under non-energizing condition exceeds a predetermined level to another condition in which the induction voltage becomes lower than or equal to the predetermined level in connection with the rotation of the magnet rotor, and the reset operation starting position is set so that a rotating amount of the pointer from the reset operation starting position to the reset position is sufficient for generating the induction voltage exceeding the predetermined level.

5. The pointing apparatus according to claim 3, wherein a plurality of the pointers are provided which are rotated by the respective stepping motors, the reference pointing positional information for each pointer are separately stored in a storage of the pointing position correcting apparatus, the reset operation starting positional information for each pointer are separately stored in a storage of the pointing position correcting apparatus, the prereset operation is carried out in such a manner that when a command signal is inputted, each of the pointers is rotated to the reset operation starting position which is indicated by the reset operation starting positional information for the respective pointers in a separate manner every the pointer, and the reset operation and the correcting operation are independently carried out in a separate manner with respect to each of the pointers.

* * * * *